United States Patent
Oonishi et al.

(10) Patent No.: US 12,474,410 B2
(45) Date of Patent: Nov. 18, 2025

(54) STATE ESTIMATION METHOD, STATE ESTIMATION APPARATUS, STATE ESTIMATION SYSTEM, AND NON-TRANSITORY STORAGE MEDIUM

(71) Applicant: KABUSHIKI KAISHA TOSHIBA, Tokyo (JP)

(72) Inventors: Atsuro Oonishi, Kawasaki (JP); Takehiro Hato, Tokyo (JP); Hideki Ito, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 18/168,618

(22) Filed: Feb. 14, 2023

(65) Prior Publication Data
US 2024/0053405 A1    Feb. 15, 2024

(30) Foreign Application Priority Data
Aug. 12, 2022  (JP) .................. 2022-128938

(51) Int. Cl.
*G01R 31/389*   (2019.01)
*G01R 31/374*   (2019.01)
*G01R 31/382*   (2019.01)

(52) U.S. Cl.
CPC ......... *G01R 31/389* (2019.01); *G01R 31/374* (2019.01); *G01R 31/382* (2019.01)

(58) Field of Classification Search
CPC .. G01R 31/36; G01R 31/3648; G01R 31/374; G01R 31/382–3842; G01R 31/385; G01R 31/387; G01R 31/389; G01R 31/392
See application file for complete search history.

(56) References Cited

U.S. PATENT DOCUMENTS

| | | | |
|---|---|---|---|
| 11,187,754 B2 | 11/2021 | Sugiyama et al. | |
| 2010/0185405 A1* | 7/2010 | Aoshima | B60L 58/22 702/63 |
| 2016/0084918 A1* | 3/2016 | Hongo | G01R 31/3648 702/63 |

(Continued)

FOREIGN PATENT DOCUMENTS

| | | | |
|---|---|---|---|
| JP | 6647986 B2 | 2/2020 | |
| JP | 7039499 B2 | 3/2022 | |

*Primary Examiner* — Huy Q Phan
*Assistant Examiner* — David B Frederiksen
(74) *Attorney, Agent, or Firm* — Oblon, McClelland, Maier & Neustadt, L.L.P.

(57) ABSTRACT

In a state estimation method of an embodiment, from time series data representing a time change of a main physical quantity concerning an estimation target, a local maximum and minimum values of the main physical quantity, and an inter-extreme-value time from an extreme value to the next extreme value are extracted. In the state estimation method, a state change speed of the estimation target is calculated based on relationship data representing the relationship of the state change speed with the local maximum and minimum values and the extracted local maximum and minimum values. In the state estimation method, a state change amount of the estimation target is calculated for each inter-extreme-value time based on the extracted inter-extreme-value time and the calculated state change speed.

17 Claims, 10 Drawing Sheets

(56) References Cited

U.S. PATENT DOCUMENTS

| | | | |
|---|---|---|---|
| 2016/0252582 A1* | 9/2016 | Iida | H01M 10/48 |
| | | | 702/63 |
| 2019/0113581 A1* | 4/2019 | Kawamura | B60L 58/12 |
| 2019/0195960 A1* | 6/2019 | Koba | G01R 31/389 |
| 2020/0132782 A1* | 4/2020 | Hong | H01M 10/44 |
| 2020/0355749 A1* | 11/2020 | Takahashi | H01M 10/0525 |
| 2020/0386819 A1* | 12/2020 | Lee | G01R 31/382 |
| 2022/0283229 A1* | 9/2022 | Uoshima | G01R 31/392 |

* cited by examiner

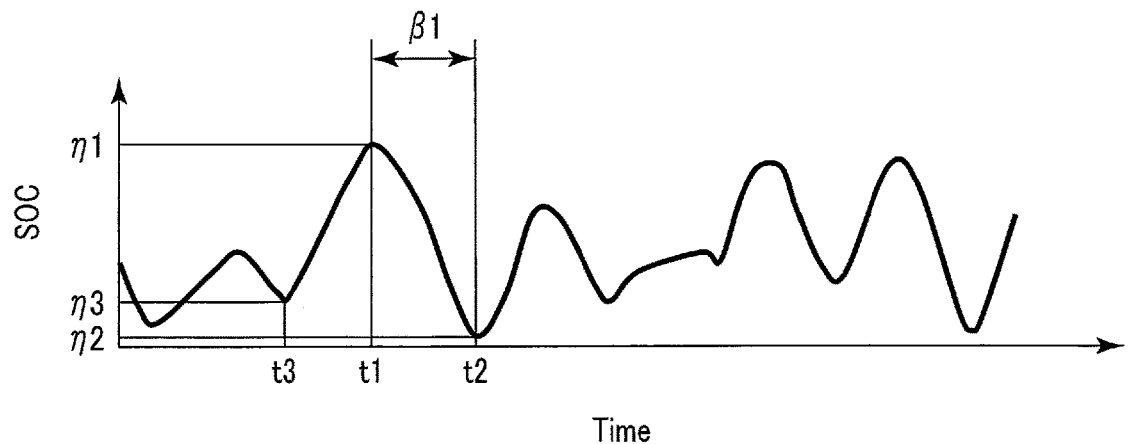
F I G. 3
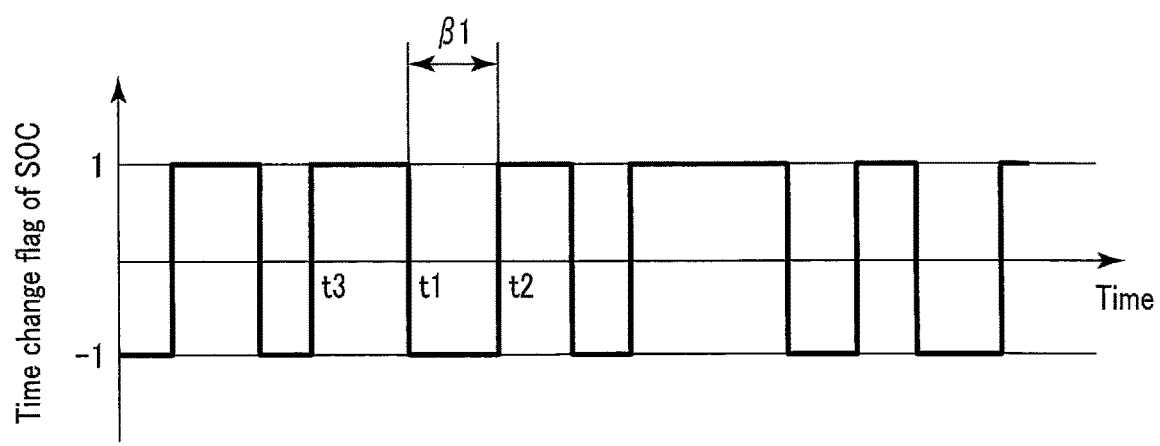
F I G. 4
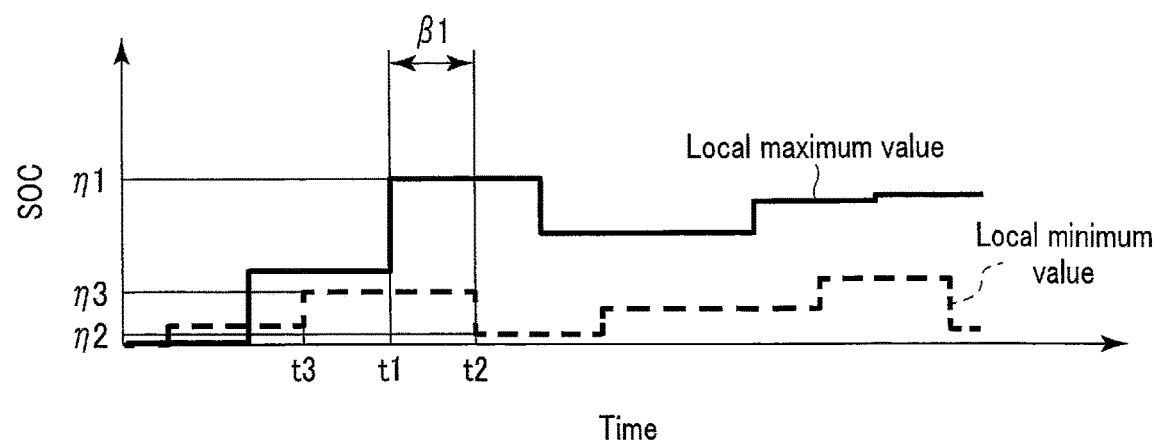
F I G. 5

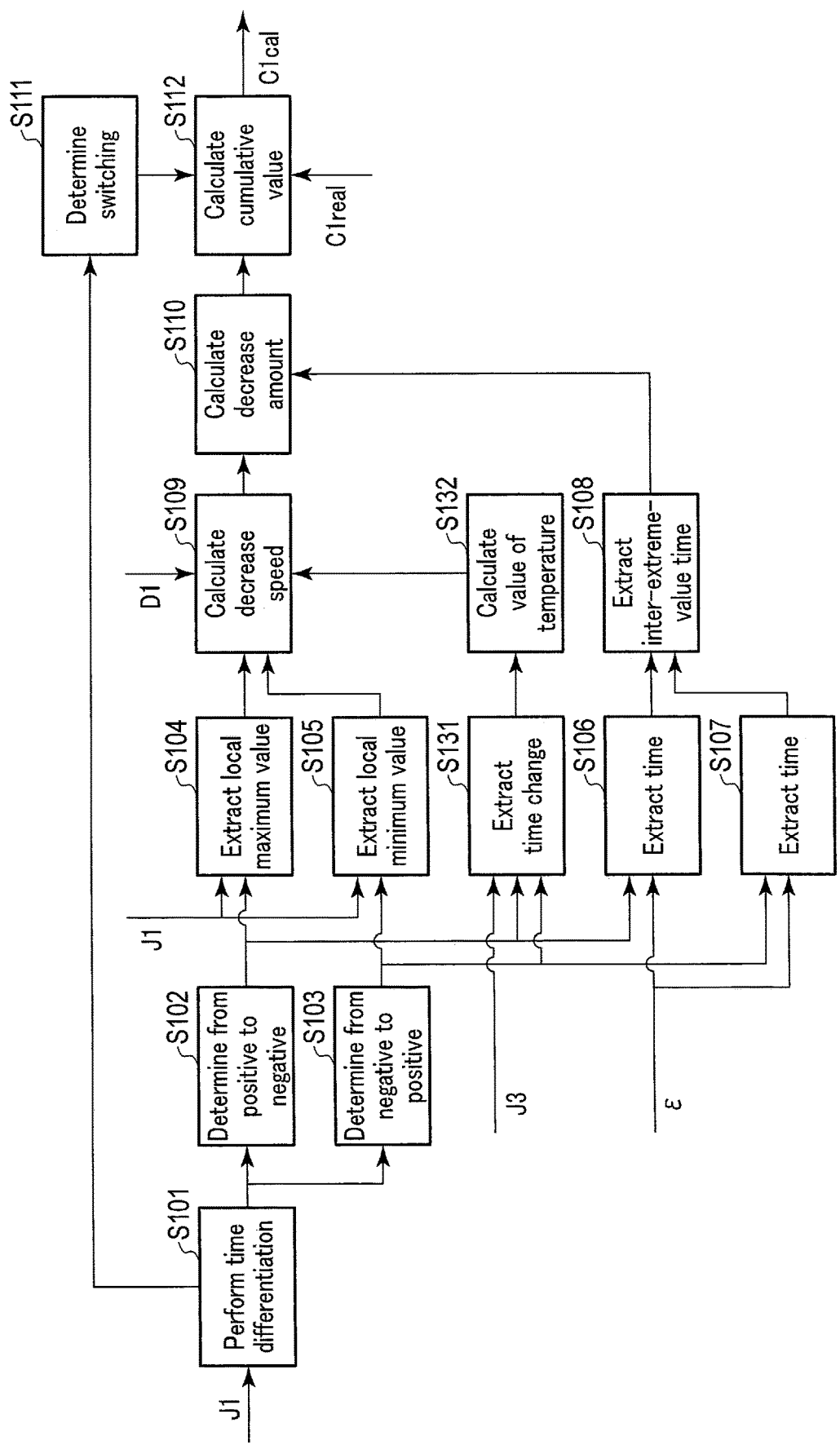
F I G. 10

STATE ESTIMATION METHOD, STATE ESTIMATION APPARATUS, STATE ESTIMATION SYSTEM, AND NON-TRANSITORY STORAGE MEDIUM

CROSS-REFERENCE TO RELATED APPLICATIONS

This application is based upon and claims the benefit of priority from Japanese Patent Application No. 2022-128938, filed Aug. 12, 2022; the entire contents of which are incorporated herein by reference.

FIELD

Embodiments described herein relate generally to a state estimation method, a state estimation apparatus, a state estimation system, and a non-transitory storage medium.

BACKGROUND

In estimation of a state change of an estimation target, the state change speed, the state change amount, and the like of the estimation target are estimated based on physical quantities concerning the estimation target. For example, when estimating a state change of a battery as an estimation target, the SOC of the battery, the temperature of the battery, the current flowing to the battery, and the like are measured as physical quantities concerning the battery, and the degradation speed of the battery, the degradation degree of the battery, and the like are estimated using the measured physical quantities as indices. When estimating the state change of the estimation target based on the physical quantities concerning the estimation target in the above-described way, it is required that the apparatus and system for performing estimation have simple configurations and are easily implemented. In addition, the estimation accuracy for the state change of the estimation target is required to be high.

BRIEF DESCRIPTION OF THE DRAWINGS

FIG. 3 is a schematic view showing an example of SOC time series data used for processing in the state estimation apparatus according to the first embodiment.

FIG. 4 is a schematic view showing data of the time change flag of an SOC generated from the SOC time series data of the example shown in FIG. 3 in the first embodiment.

FIG. 5 is a schematic view showing the time changes of the local maximum value and the local minimum value of the SOC extracted from the SOC time series data of the example shown in FIG. 3 in the first embodiment.

FIG. 10 is a schematic view showing an example of processing performed by a processing circuit executing a state estimation program in a state estimation apparatus according to the third embodiment.

DETAILED DESCRIPTION

In a state estimation method according to an embodiment, from time series data representing a time change of a main physical quantity concerning an estimation target, a local maximum value and a local minimum value, which are the extreme values of the main physical quantity, and an inter-extreme-value time from an extreme value to the next extreme value are extracted. In the state estimation method, the state change speed of the estimation target is calculated for each inter-extreme-value time based on relationship data representing the relationship of the state change speed of the estimation target with the local maximum value and the local minimum value of the main physical quantity and the extracted local maximum value and local minimum value of the main physical quantity. In the state estimation method, the state change amount of the estimation target is calculated for each inter-extreme-value time based on the extracted inter-extreme-value time and the calculated state change speed.

Hereinafter, embodiments will be described with reference to the accompanying drawings.

First Embodiment

Figure 1:
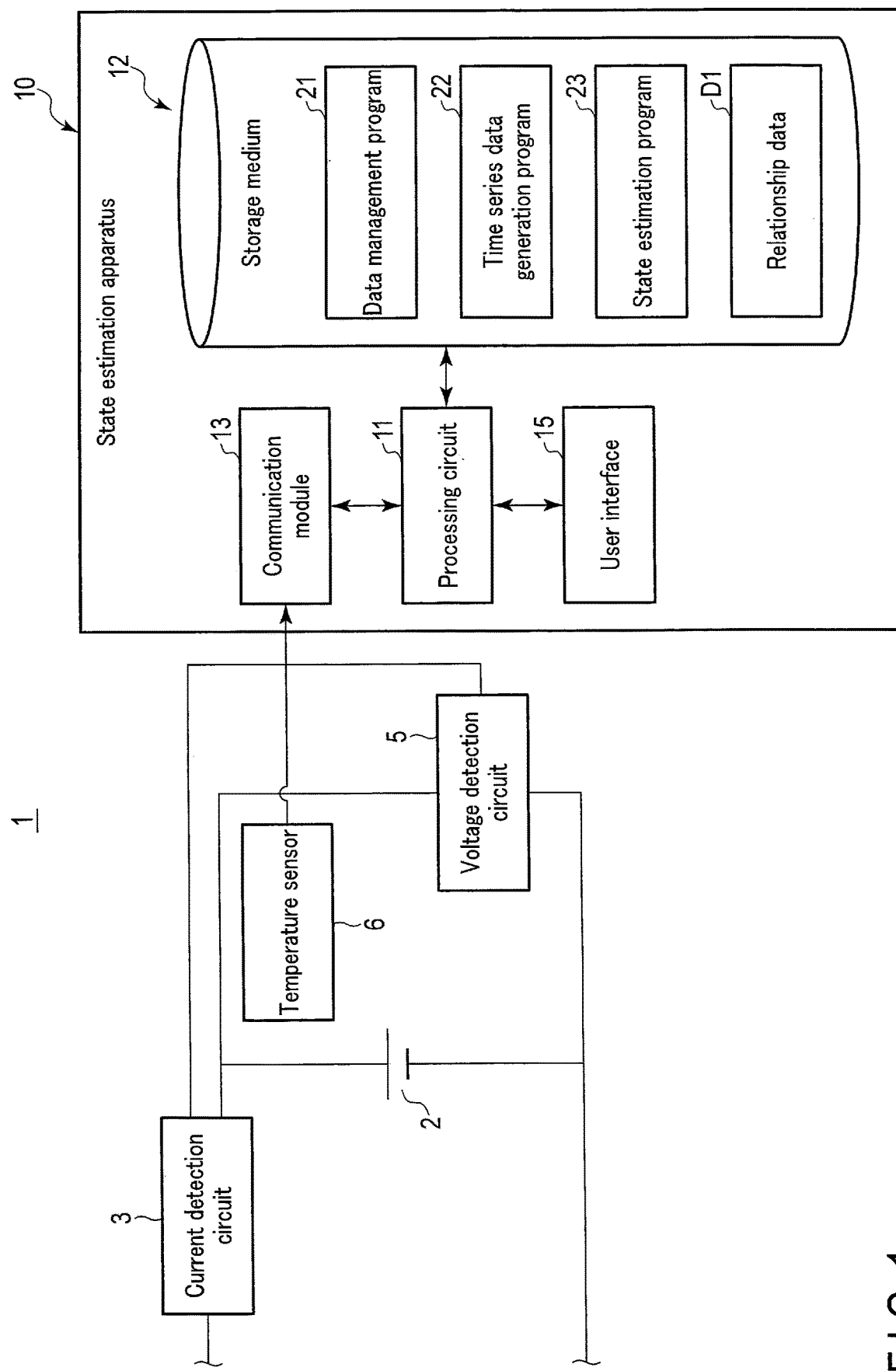
FIG. 1 is a schematic view showing a state estimation system according to the first embodiment.

To begin with, the first embodiment will be described as one example of embodiments. FIG. 1 illustrates a state estimation system 1 according to the first embodiment. In the state estimation system 1, a state change of a battery 2 as an estimation target is estimated. As the state change of the battery 2, for example, the degradation speed of the battery 2 and the degradation degree of the battery 2 from the start time point of use of the battery 2 are estimated. As the state change speed of the battery 2, which is the degradation speed of the battery 2, the decrease speed of the capacity of the battery 2, the rising speed of the resistance of the battery 2, and the like are calculated. Also, as the state change amount of the battery 2, which is the degradation degree of the battery 2, the decrease amount of the capacity of the battery 2 from the start time point of use, the rising amount of the resistance of the battery 2 from the start time point of use, and the like are calculated.

The battery 2 as the state change estimation target is, for example, a secondary battery such as a lithium ion secondary battery. The battery 2 may be formed by a unit cell (unit battery), or may be a battery module or a cell block formed by electrically connecting a plurality of unit cells. When the battery 2 is formed by a plurality of unit cells, the plurality of unit cells may electrically be connected in series, or may electrically be connected in parallel in the battery 2. In addition, both a series-connection structure in which a plurality of unit cells are connected in series and a parallel-connection structure in which a plurality of unit cells are connected in parallel may be formed in the battery 2. Furthermore, the battery 2 may be any one of a battery string, a battery array, and a storage battery, in each of which a plurality of battery modules are electrically connected. Also, the battery 2 may be a battery module in which a plurality of unit cells are electrically connected, and each of the plurality of unit cells may be the state change estimation target.

A current detection circuit 3, a voltage detection circuit 5, and a temperature sensor 6 are provided in the state estimation system 1. The current detection circuit 3 periodically detects and measures a current flowing to the battery 2, and the voltage detection circuit 5 periodically detects and measures a voltage applied to the battery 2. The temperature sensor 6 periodically detects and measures the temperature of the battery 2.

The state estimation system 1 includes a state estimation apparatus 10. The state estimation apparatus 10 estimates the state change of the battery 2 and, for example, estimates the cumulative value of one or more of the decrease amount of the capacity of the battery 2 and the rising amount of the resistance of the battery 2 from a certain time such as the start time point of use of the battery 2. In the example shown in FIG. 1 or the like, the state estimation apparatus 10 is a processing apparatus (computer) such as a server and includes a processing circuit 11, a storage medium (non-transitory storage medium) 12, a communication module 13, and a user interface 15. The processing circuit 11 is formed by a processor or an integrated circuit. The processor or the like forming the processing circuit 11 includes one of a CPU (Central Processing Unit), an ASIC (Application Specific Integrated Circuit), a microcomputer, an FPGA (Field Programmable Gate Array), and a DSP (Digital Signal Processor). The processing circuit 11 may be formed by one processor or the like, or may be formed by a plurality of processors or the like.

The storage medium 12 is one of a main storage device such as a memory and an auxiliary storage device. As the storage medium 12, a magnetic disk, an optical disk (for example, a CD-ROM, a CD-R, or a DVD), a magnetooptical disk (for example, an MO), or a semiconductor memory can be used. The state estimation apparatus 10 may include only one memory serving as the storage medium 12, or may include a plurality of memories.

The processing circuit 11 performs processing by executing programs and the like stored in the storage medium 12. In the example shown in FIG. 1, the programs to be executed by the processing circuit 11 include a data management program 21, a time series data generation program 22, and a state estimation program 23. The processing circuit 11 executes the data management program 21, thereby performing data write to the storage medium 12 and data read from the storage medium 12. Also, the processing circuit 11 executes the time series data generation program 22, thereby performing processing of generating time series data to be described later. In addition, the processing circuit 11 executes the state estimation program 23, thereby performing processing of estimating the state change of the battery 2 to be described later.

Note that in an example, the state estimation apparatus 10 is formed by a plurality of processing apparatuses (computers) such as a plurality of servers, and the processors of the plurality of processing apparatuses cooperatively perform processing to be described later. In another example, the state estimation apparatus 10 is formed by a cloud server in a cloud environment. The infrastructure of the cloud environment is formed by a virtual processor such as a virtual CPU and a cloud memory. Hence, if the state estimation apparatus 10 is formed by a cloud server, on behalf of the processing circuit 11, the virtual processor performs processing to be described later, including processing of estimating the state change of the battery 2. The cloud memory has a function of storing programs and data, like the storage medium 12.

In an example, the storage medium 12 that stores the programs to be executed by the processing circuit 11 and data to be used for the processing of the processing circuit 11 is provided in a computer separate from the state estimation apparatus 10. In this case, the state estimation apparatus 10 is connected, via a network, to the computer in which the storage medium 12 and the like are provided. In another example, the state estimation apparatus 10 is mounted in a battery mounting device (not shown) in which the battery 2 is mounted. In this case, in the state estimation apparatus 10, on behalf of the processing circuit 11, a processor or the like mounted in the battery mounting device performs processing to be described later, including processing of estimating the state change of the battery 2.

The communication module 13 is formed by the communication interface of the processing apparatus that forms the state estimation apparatus 10. The processing circuit 11 communicates with an external device or the like via the communication module 13. The processing circuit 11 receives the measurement results in the current detection circuit 3, the voltage detection circuit 5, and the temperature sensor 6, via the communication module 13. On the user interface 15, the user of the state estimation system 1, or the like inputs an operation associated with estimation of the state change of the battery 2. Hence, the user interface 15 is provided with buttons, a mouse, a touch panel, or a keyboard serving as an operation unit used by the user to input an operation. Also, the user interface 15 is provided with a notification unit that notifies information associated with estimation of the state change of the battery 2. The notification unit notifies the information by screen display or sound generation. Note that the user interface 15 may be provided separately from the processing apparatus that forms the state estimation apparatus 10.

The processing circuit 11 executes the time series data generation program 22, thereby generating time series data. In the generation of time series data, the processing circuit 11 generates current time series data representing the time change of the current flowing to the battery 2 based on the measurement result in the current detection circuit 3, and generates voltage time series data representing the time change of the voltage applied to the battery 2 based on the measurement result in the voltage detection circuit 5. Then, the processing circuit 11 generates temperature time series data representing the time change of the temperature of the battery 2 based on the measurement result in the temperature sensor 6. Note that as for the current of the battery 2, for example, a current input to the battery 2, that is, the charging current of the battery 2 is represented by a positive value, and a current output from the battery 2, that is, the discharging current is represented by a negative value.

Also, in the battery 2, the electric charge amount (charging amount) and the SOC (State Of Charge) of the battery 2 are defined as parameters representing the charging state of the battery 2. In the generation of time series data, the processing circuit 11 generates SOC time series data representing the time change of the SOC of the battery 2. For example, in the battery 2, a state in which the electric charge amount is a first electric charge amount is defined as a state in which the SOC is 0%, and a state in which the electric charge amount is a second electric charge amount larger than the first electric charge amount is defined as a state in which the SOC is 100%. The ratio of a subtraction value obtained by subtracting the first electric charge amount from an electric charge amount in real time to a subtraction value obtained by subtracting the first electric charge amount from the second electric charge amount is the SOC of the battery 2 in real time.

Also, the electric charge amount of the battery 2 in real time can be calculated based on the electric charge amount of the battery 2 at a predetermined time serving as a reference and the time change of the current from the predetermined time. For example, the processing circuit 11 adds the time integrated value of the current from the predetermined time serving as a reference to the electric charge amount of the battery 2 at the predetermined time, thereby calculating the electric charge amount of the battery 2 in real time. Then, using the calculation result of the electric charge amount of the battery 2 in real time, the processing circuit 11 calculates the SOC of the battery 2 in real time in the above-described way. Hence, the processing circuit 11 can calculate SOC time series data representing the time change of the SOC of the battery 2.

Note that in the generated time series data, only measurement values at the last measurement time may be shown for the physical quantities concerning the battery 2 such as the above-described SOC, current, and temperature. In this case, the physical quantities concerning the battery 2 are periodically measured. Every time measurement is newly performed for a physical quantity concerning the battery 2, the value (measurement value) in time series data is sequentially rewritten from the measurement value in the preceding measurement to the newly measured measurement value.

Also, in the battery 2, a lower limit voltage Vmin and an upper limit voltage Vmax are defined for the voltage. In the battery 2, a charging capacity (charging electric charge amount) until the voltage changes from the lower limit voltage Vmin to the upper limit voltage Vmax in charging under a predetermined condition or a discharging capacity (discharging electric charge amount) until the voltage changes from the upper limit voltage Vmax to the lower limit voltage Vmin in discharging under a predetermined condition is defined as the capacity of the battery 2. The capacity of the battery 2 decreases when the battery 2 is repetitively charged and discharged. Even in a state in which charging and discharging of the battery 2 are not performed, the capacity of the battery 2 decreases along with the elapse to time.

Also, the processing circuit 11 executes the state estimation program 23, thereby estimating the state change of the battery 2 as the estimation target. In the estimation of the state change of the battery 2, measurement data generated in the above-described way is used. In the following explanation, the decrease amount of the capacity of the battery 2 is estimated as a state change amount representing the state change of the battery 2. Note that the state change amount to be estimated is not limited to the decrease amount of the capacity if it is a state change amount representing the degradation degree of the battery 2. Processing of estimating the decrease amount of the capacity of the battery 2 to be described below can also be applied to, for example, estimation of another state change amount representing the degradation degree of the battery 2, such as the rising amount of the resistance of the battery 2.

In processing of estimating the decrease amount of the capacity of the battery 2, the processing circuit 11 performs the processing using the SOC of the battery 2, which is a physical quantity concerning the battery 2, as a main physical quantity. The processing circuit 11 then extracts, from the SOC time series data (first time series data) J1, the local maximum value and the local minimum value of the SOC, which are the extreme values of the SOC, and an inter-extreme-value time that is the time from an extreme value of the SOC to the next extreme value. During use of the battery 2, charging and discharging of the battery 2 are repetitively performed. In charging of the battery 2, the SOC increases. In discharging of the battery 2, the SOC decreases. Hence, in the SOC time series data J1, the SOC of the battery 2 exhibits the local maximum value when switching from charging to discharging, and the SOC of the battery 2 exhibits the local minimum value when switching from discharging to charging. Hence, in the SOC time series data J1, the extreme values of the SOC exist.

Figure 2:
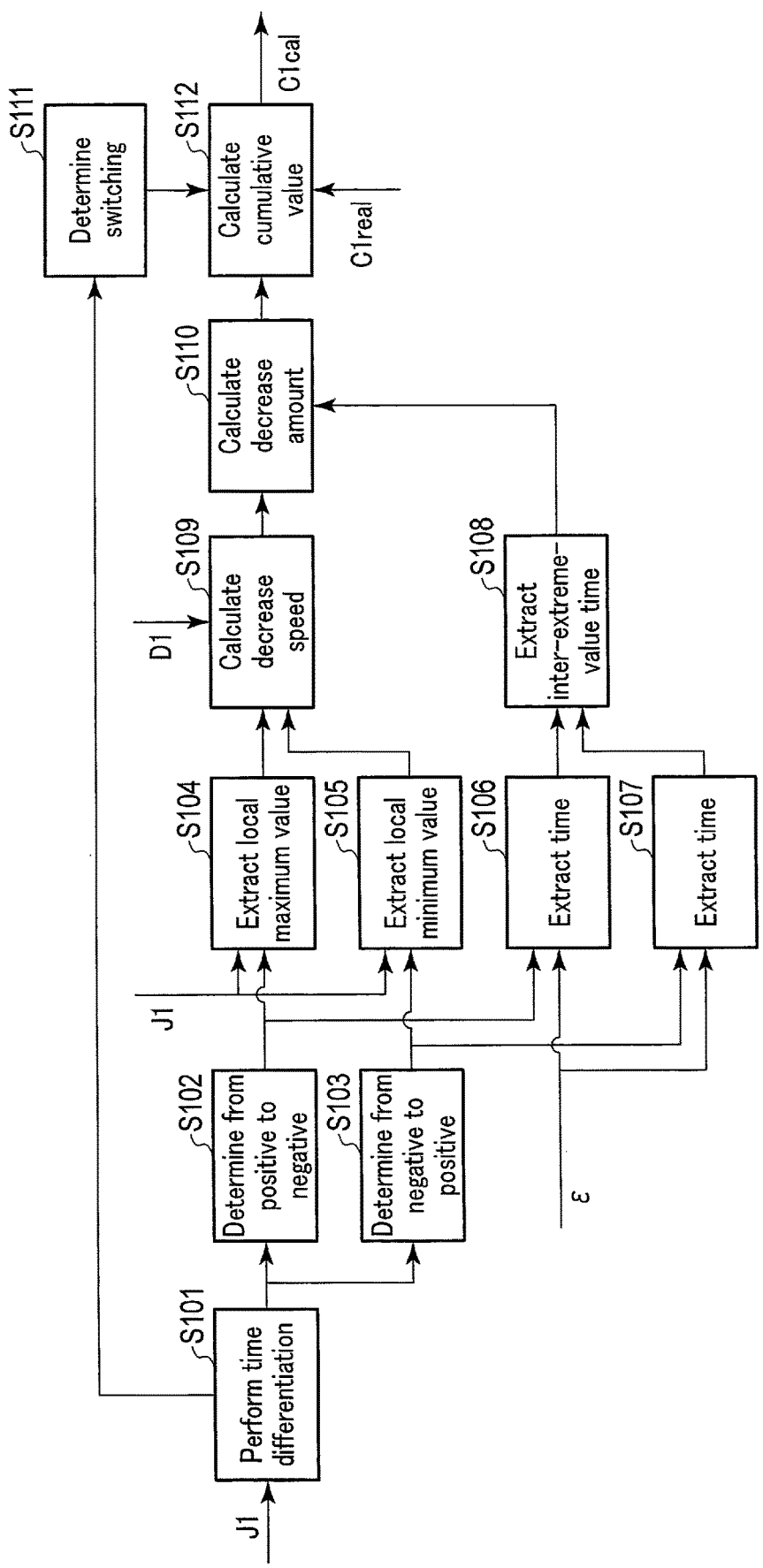
FIG. 2 is a schematic view showing an example of processing performed by a processing circuit executing a state estimation program in a state estimation apparatus according to the first embodiment.

FIG. 2 shows an example of processing performed by the processing circuit 11 executing the state estimation program 23 in this embodiment. In the example shown in FIG. 2, the processing circuit 11 time-differentiates the SOC of the battery 2, which is the main physical quantity in the SOC time series data J1 (step S101). Accordingly, the time change of the differential value of the SOC is calculated, and differential value time series data representing the time change of the differential value of the SOC is generated. The processing circuit 11 then determines switching of the differential value of the SOC from positive to negative based on the differential value time series data (step S102). Also, the processing circuit 11 determines switching of the differential value of the SOC from negative to positive based on the differential value time series data (step S103). In the determination of steps S102 and S103, the differential value time series data may be converted into time series data of the time change flag of the SOC. The time series data of the time change flag of the SOC is generated by, for example, converting the positive value of the differential value into 1 and converting the negative value of the differential value into −1 in the differential value time series data.

Upon determining that the differential value of the SOC switches from positive to negative, the processing circuit 11 extracts, based on the SOC time series data, the value of the SOC at the timing when the differential value of the SOC switches from positive to negative as the local maximum value of the SOC (main physical quantity) (step S104). Also, upon determining that the differential value of the SOC switches from negative to positive, the processing circuit 11 extracts, based on the SOC time series data, the value of the SOC at the timing when the differential value of the SOC switches from negative to positive as the local minimum value of the SOC (main physical quantity) (step S105). The extraction of the local maximum value and the local minimum value of the SOC is performed by, for example, sampling and holding the value of the SOC at each of the timing when the differential value switches from positive to negative and the timing when the differential value switches from negative to positive.

Upon determining that the differential value of the SOC switches from positive to negative, the processing circuit 11 extracts, based on time information s, the time of the timing when the differential value of the SOC switches from positive to negative as the time at which the SOC (main physical quantity) obtains the local maximum value (step S106). Also, upon determining that the differential value of the SOC switches from negative to positive, the processing circuit 11 extracts, based on the time information s, the time of the timing when the differential value of the SOC switches from negative to positive as the time at which the SOC (main physical quantity) obtains the local minimum value (step S107). The extraction of the times at which the SOC obtains the local maximum value and the local minimum value is performed by, for example, sampling and holding the time at each of the timing when the differential value switches from positive to negative and the timing when the differential value switches from negative to positive.

The processing circuit 11 then extracts, based on the times extracted by the processes of steps S106 and S107, the inter-extreme-value time from the extreme value of the SOC to the next extreme value from the SOC time series data (first time series data) J1 (step S108). At this time, for example, the absolute value of the difference value between the time extracted by the process of step S106 and the time extracted by the process of step S107 is calculated as the inter-extreme-value time. By extracting the inter-extreme-value time in this way, each of the time from the timing when the differential value of the SOC switches from positive to negative to the timing when the differential value switches from negative to positive next and the time from the timing when the differential value of the SOC switches from negative to positive to the timing when the differential value switches from positive to negative next is extracted as the inter-extreme-value time.

Figure 6:
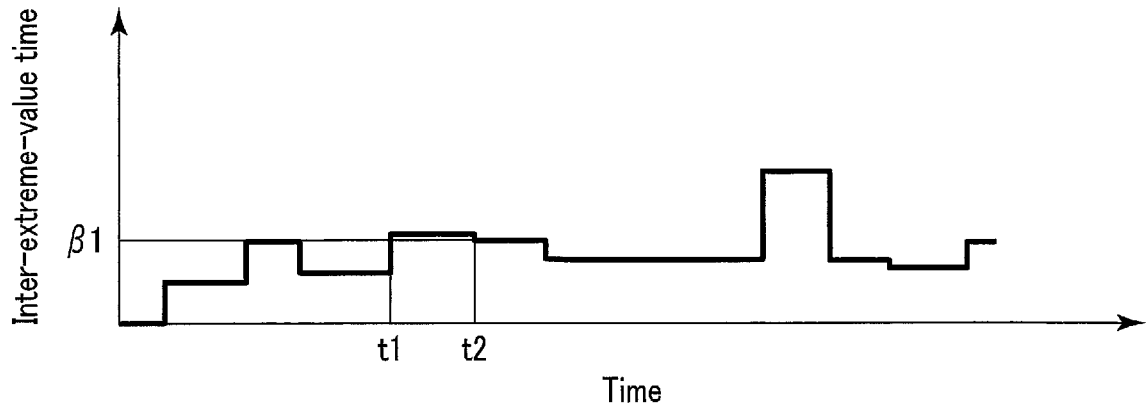
FIG. 6 is a schematic view showing the time change of inter-extreme-value time extracted from the SOC time series data of the example shown in FIG. 3 in the first embodiment.

FIG. 3 shows an example of SOC time series data. FIG. 4 shows the data of the time change flag of the SOC generated from the SOC time series data of the example shown in FIG. 3. FIG. 5 shows the time changes of the local maximum value and the local minimum value of the SOC extracted from the SOC time series data of the example shown in FIG. 3. FIG. 6 shows the time change of the inter-extreme-value time extracted from the SOC time series data of the example shown in FIG. 3. In each of FIGS. 3, 4, 5, and 6, the abscissa represents time. In FIGS. 3 and 5, the ordinate represents the SOC. In FIG. 4, the ordinate represents the value of the time change flag of the SOC. In FIG. 6, the ordinate represents the inter-extreme-value time. Also, in FIG. 5, the time change of the extracted local maximum value of the SOC is indicated by a solid line, and the time change of the extracted local minimum value of the SOC is indicated by a broken line.

In the example shown in FIGS. 3, 4, 5, and 6, at time t1, the time change flag of the SOC switches from 1 to −1. Hence, a value η1 of the SOC at time t1 is extracted as the local maximum value of the SOC by the process of step S104, and time t1 is extracted as the time when the SOC obtains the local maximum value by the process of step S106. Also, at time t2 after time t1, the time change flag of the SOC switches from −1 to 1. Hence, a value η2 of the SOC at time t2 is extracted as the local minimum value of the SOC by the process of step S105, and time t2 is extracted as the time when the SOC obtains the local minimum value by the process of step S107. In addition, a time interval I31 from time t1 to time t2 is extracted as the inter-extreme-value time by the process of step S108. Note that between time t1 and time t2, a value η3 of the SOC at time t3 before time t1 is extracted as the local minimum value of the SOC.

Also, as shown in FIG. 1 and the like, the storage medium 12 stores relationship data D1 in addition to the above-described programs. The relationship data (first relationship data) D1 represents the relationship of the decrease speed of the capacity of the battery 2, which is the state change speed, with the local maximum value and the local minimum value of the SOC as the main physical quantity. For example, the relationship data D1 represents an expression, a function, a graph, a table, or the like which calculates the decrease speed of the capacity of the battery 2 using the local maximum value and the local minimum value of the SOC, and represents, for example, a function for calculating the decrease speed of the capacity using the local maximum value and the local minimum value of the SOC as arguments. Note that when estimating the rising amount of the resistance of the battery 2 as the state change amount, the relationship data D1 represents the relationship of the rising speed of the resistance of the battery 2, which is the state change speed, with the local maximum value and the local minimum value of the SOC. Also, the state change speed represents a state change amount per unit time such as a state change amount per day.

The relationship data D1 is generated based on, for example, the test result of a cycle test conducted in advance for the same battery as the battery 2. In the cycle test, a lower limit value ηmin and an upper limit value ηmax are set for the SOC, and charging from the lower limit value ηmin to the upper limit value ηmax and discharging from the upper limit value ηmax to the lower limit value ηmin are repeated, thereby confirming the degradation degree of the battery including the decrease of the capacity of the battery. Then, cycle tests are performed under a plurality of conditions that are different from each other in at least one of the lower limit value ηmin and the upper limit value ηmax, and the relationship data D1 is generated based on the degradation degree of the battery or the like in each of the cycle tests under the plurality of conditions.

Figure 7:
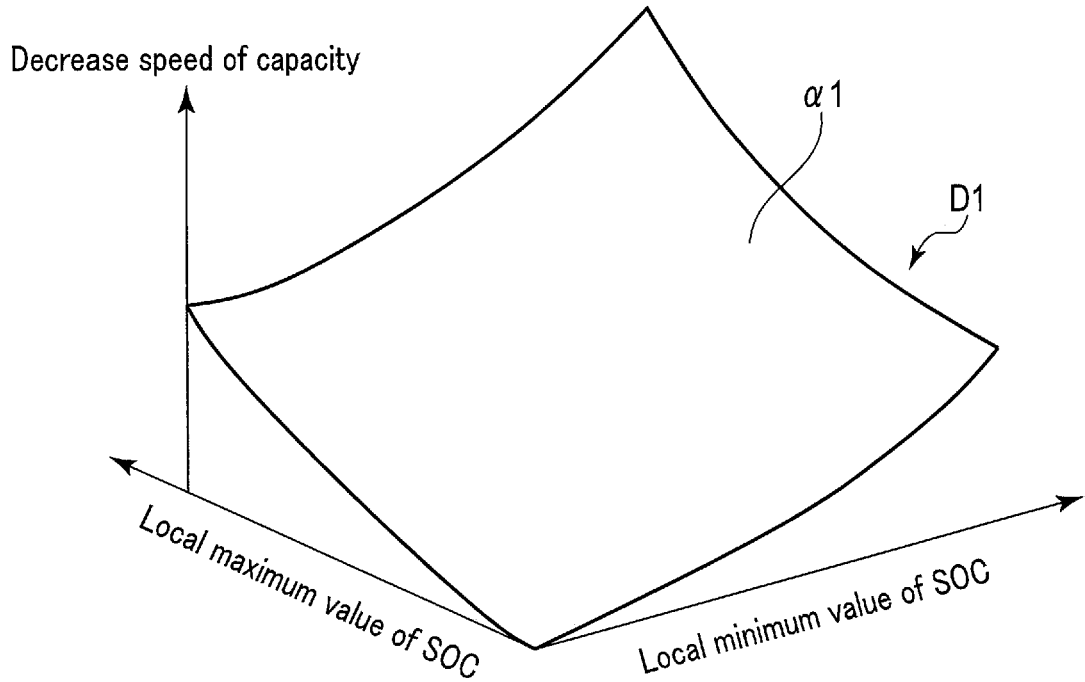
FIG. 7 is a schematic view showing an example of associated data (first associated data) stored in the storage medium of the state estimation apparatus in the first embodiment.

FIG. 7 shows an example of the relationship data D1. In the relationship data D1 of the example shown in FIG. 7, a response surface α1 is shown on a 3-axis coordinate system in which the local maximum value of the SOC is represented by the first axis, the local minimum value of the SOC is represented by the second axis, and the decrease speed of the capacity is represented by the third axis. The response surface α1 represents the relationship of the decrease speed of the capacity of the battery 2 with the local maximum value and the local minimum value of the SOC.

Note that in the cycle test, if the plurality of conditions are identical to each other concerning the lower limit value ηmin and the upper limit value ηmax of the SOC but are different from each other in at least one of the temperature of the battery and the magnitude of the current flowing to the battery, the degradation degrees are different from each other. For this reason, the relationship data D1 preferably represents, for each of a plurality of conditions that are different from each other in at least one of the temperature of the battery 2 and the absolute value of the current (the magnitude of the current), the relationship of the decrease speed of the capacity of the battery 2 with the local maximum value and the local minimum value of the SOC. In this embodiment, however, the temperature of the battery 2 and the magnitude of the current flowing to the battery 2 in charging and discharging are assumed not to change for the descriptive convenience. The relationship data D1 is assumed to represent the relationship of the decrease speed of the capacity of the battery 2 with the local maximum value and the local minimum value of the SOC under a condition that the temperature of the battery 2 is a predetermined temperature, and the magnitude of the current (the absolute value of the current) flowing to the battery 2 is a predetermined magnitude.

As shown in FIG. 2, in the processing of estimating the decrease amount of the capacity of the battery 2, the processing circuit 11 calculates the decrease speed of the capacity of the battery 2 for each inter-extreme-value time based on the local maximum value and the local minimum value of the SOC extracted by the processes of steps S104 and S105 and the above-described relationship data D1 (step S109). At this time, the extracted local maximum value and the local minimum value of the SOC are substituted into a function including the local maximum value and the local minimum value as arguments, thereby calculating the decrease speed of the capacity of the battery 2 as the state change speed of the battery 2. Note that the state change speed calculated based on the relationship data (first relationship data) D1 is also called a "first state change speed", and the decrease speed of the capacity calculated by the process of step S109 is also called a "first decrease speed".

Then, based on the inter-extreme-value time extracted by the process of step S108 and the decrease speed of the capacity calculated by the process of step S109, the processing circuit 11 calculates the decrease amount of the capacity of the battery 2 for each inter-extreme-value time (step S110). At this time, the decrease amount of the capacity, which is the state change amount of the battery 2, is calculated by, for example, multiplying the decrease speed of the capacity by the inter-extreme-value time.

Here, assume that the decrease speed and the decrease amount of the capacity of the battery 2 are calculated for each inter-extreme-value time from the SOC time series data of the example shown in FIG. 3. In this case, as described above, for the inter-extreme-value time 131 between time t1 and time t2, the value η1 is extracted as the local maximum value of the SOC, and the value η3 is extracted as the local minimum value of the SOC. For this reason, the decrease speed of the capacity is calculated using the values η1 and η3 and the relationship data D1. For example, a decrease speed v1 is calculated. Then, for example, a value obtained by multiplying the decrease speed v1 by the inter-extreme-value time β1 is calculated as the decrease amount of the capacity of the battery 2 in the inter-extreme-value time β1 between time t1 and time t2.

Also, in the processing of estimating the decrease amount of the capacity of the battery 2, the processing circuit 11 calculates a cumulative value of the decrease amount of the capacity, which is the state change amount of the battery 2, based on the decrease amount of the capacity of the battery 2 for each inter-extreme-value time. As the cumulative value of the decrease amount of the capacity, a cumulative value from the start time point of use of the battery 2 may be calculated, or a cumulative value from the start time point of measurement of the current or the like of the battery 2 may be calculated. As shown in FIG. 2, in the calculation of the cumulative value of the decrease amount of the capacity, the processing circuit 11 determines switching between positive and negative of the differential value of the SOC based on the differential value time series data generated by the process of step S101 (step S111). That is, switching of the differential value of the SOC from positive to negative and switching of the differential value of the SOC from negative to positive are determined.

Upon determining that the differential value switches between positive and negative, the processing circuit 11 calculates a cumulative value C1cal of the decrease amount of the capacity based on the decrease amount of the capacity in the inter-extreme-value time calculated by the process of step S110 (step S112). At each of the timing when the differential value of the SOC switches from positive to negative and the timing when the differential value switches from negative to positive, the processing circuit 11 adds the decrease amount of the capacity in the inter-extreme-value time whose end time point is the switching timing to a cumulative value C1real of the decrease amount of the capacity in real time. Hence, at each of the timing when the differential value of the SOC as the main physical quantity switches from positive to negative and the timing when the differential value switches from negative to positive, the decrease amount of the capacity in the inter-extreme-value time is added to the cumulative value C1real in real time. Hence, every time the inter-extreme-value time ends, the decrease amount of the capacity in the inter-extreme-value time is added to the cumulative value C1real in real time.

In an example, post processing or the like is performed not every time the inter-extreme-value time ends but every time a predetermined period including a plurality of inter-extreme-value times ends, thereby calculating the cumulative value C1cal of the decrease amount of the capacity. In this case, the processing circuit 11 causes the storage medium 12 to store SOC time series data from the start time point of the predetermined period until the end time point of the predetermined period. If the predetermined period ends, the processing circuit 11 calculates the decrease amount of the capacity in each of the plurality of inter-extreme-value times included in the predetermined period in the above-described way. The processing circuit 11 then calculates the decrease amount of the capacity in the predetermined period from the decrease amount of the capacity in each of the plurality of inter-extreme-value times. Then, the processing circuit 11 adds the decrease amount of the capacity, which the state change amount of the battery 2 in the predetermined period, to the cumulative value C1real in real time. Hence, in this example, every time the predetermined period including the plurality of inter-extreme-value times ends, the state change amount in the predetermined period is added to the cumulative value of the state change amount in real time.

Addition of the decrease amount of the capacity to the cumulative value C1real in real time may be performed every time the inter-extreme-value time ends, or may be performed every time the above-described predetermined period ends. However, if the decrease amount of the capacity is added to the cumulative value C1real in real time every time the inter-extreme-value time ends, the amount of data stored in the storage medium 12 can be decreased, and the capacity of the storage medium 12 can be decreased.

Also, in this embodiment, noise may be removed using a low-pass filter or the like. Thus, the above-described processing of extracting the local maximum value and the local minimum value of the SOC from the SOC time series data is more appropriately performed. Furthermore, in this embodiment, the processing circuit 11 may calculate the remaining life of the battery 2 based on the cumulative value C1cal of the decrease amount of the capacity of the battery 2 calculated in the above-described way, that is, the cumulative value of the state change amount of the battery 2. Also, in at least one of a case where the cumulative value of the state change amount of the battery 2 is equal to or larger than a threshold and a case where the remaining life of the battery 2 is equal to or less than a threshold, the processing circuit 11 may cause the user interface 15 to output a warning.

In this embodiment, the local maximum value and the local minimum value of the SOC and the inter-extreme-value time from an extreme value of the SOC to the next extreme value are extracted from the SOC time series data (first time series data) J1 representing the time change of the SOC of the battery 2 as the main physical quantity. Then, the state change speed (first state change speed) of the battery is calculated for each inter-extreme-value time based on the relationship data (first relationship data) D1 representing the relationship of the state change speed such as the decrease speed of the capacity of the battery 2 with the local maximum value and the local minimum value of the SOC and the extracted local maximum value and local minimum value of the SOC. Based on the extracted inter-extreme-value time and the calculated state change speed, the state change amount such as the decrease amount of the capacity of the battery 2 is calculated for each inter-extreme-value time. For this reason, the state change amount of the battery 2 in each inter-extreme-value time is accurately calculated, and the estimation accuracy for the state change of the battery 2 as the estimation target becomes high.

Also, since the state change amount of the battery 2 is estimated as described above, the configurations of the state estimation apparatus 10 and the state estimation system 1 which estimate the state change of the battery 2 are simplified. Hence, the state estimation apparatus 10 and the state estimation system 1 are readily implemented.

In this embodiment, the SOC is time-differentiated in the SOC time series data J1, thereby calculating the time change of the differential value of the SOC. The value of the SOC at the timing when the differential value of the SOC switches from positive to negative is extracted as the local maximum value, and the value of the SOC at the timing when the differential value of the SOC switches from negative to positive is extracted as the local minimum value. In addition, each of the time from the timing when the differential value of the SOC switches from positive to negative to the timing when the differential value switches from negative to positive next and the time from the timing when the differential value of the SOC switches from negative to positive to the timing when the differential value switches from positive to negative next is extracted as the inter-extreme-value time. Hence, the local maximum value and the local minimum value of the SOC and the inter-extreme-value time are appropriately extracted from the SOC time series data.

Second Embodiment

The second embodiment will be described next as a modification of the first embodiment. In this embodiment, to estimate the decrease amount of the capacity, which is the state change amount of a battery 2, current time series data (second time series data) J2 representing the time change of a current flowing to the battery 2 and temperature time series data (third time series data) J3 representing the time change of the temperature of the battery 2 are used in addition to SOC time series data (first time series data) J1 described above. Also, in this embodiment, in processing of estimating the decrease amount of the capacity of the battery 2, a processing circuit 11 performs the processing using the SOC of the battery 2 as a main physical quantity, the current (the absolute value of the current) of the battery 2 as a first subordinate physical quantity, and the temperature of the battery 2 as a second subordinate physical quantity.

Figure 8:
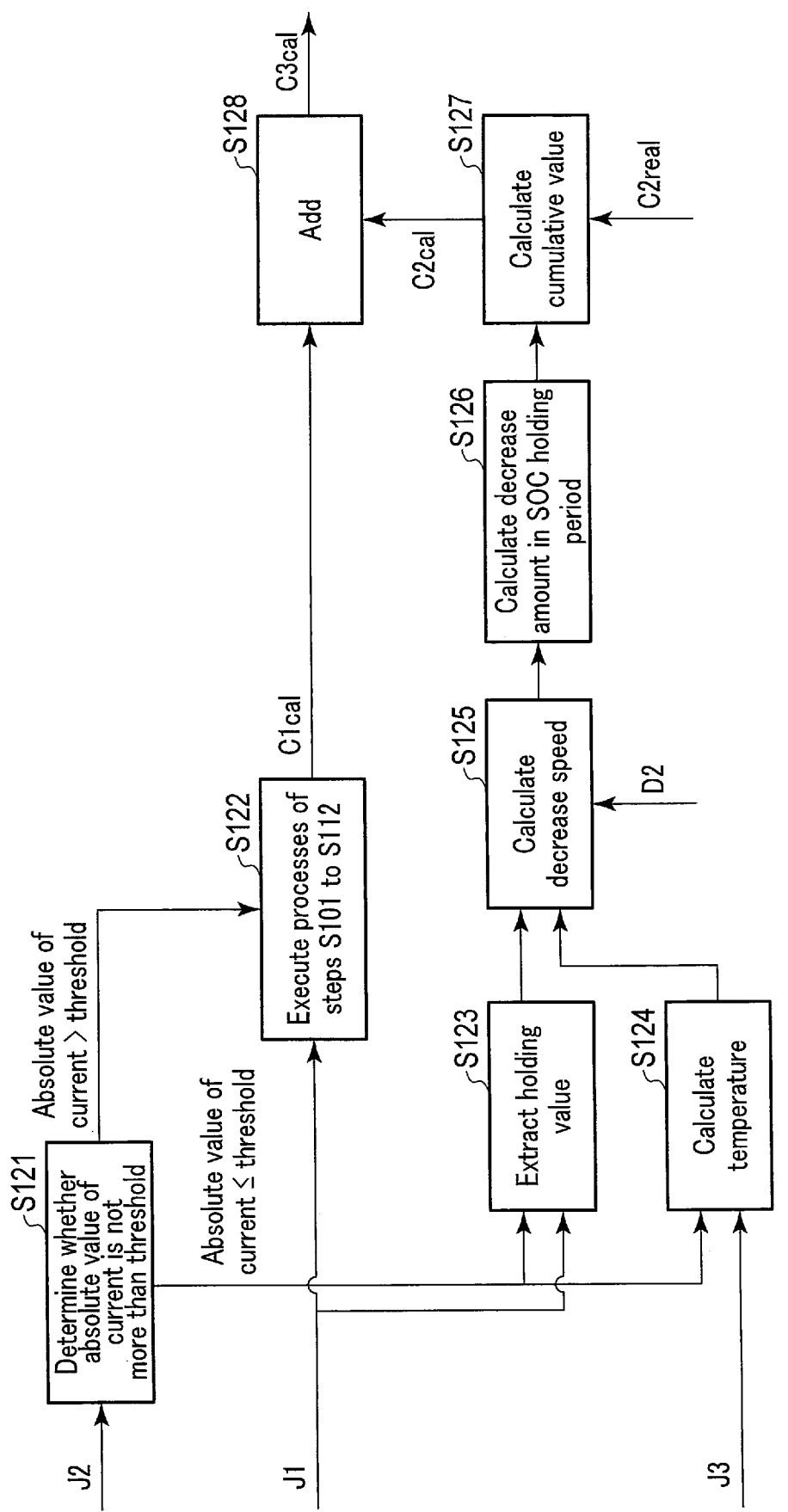
FIG. 8 is a schematic view showing an example of processing performed by a processing circuit executing a state estimation program in a state estimation apparatus according to the second embodiment.

FIG. 8 shows an example of processing performed by the processing circuit 11 executing a state estimation program 23 in this embodiment. In the example shown in FIG. 8, the processing circuit 11 determines, based on the current time series data J2, whether the absolute value of the current of the battery 2 is equal to or smaller than a threshold (step S121). The threshold is set to such a value that prevents the SOC of the battery 2 from changing even if the current with the magnitude of the threshold flows to the battery 2. Hence, by determining whether the absolute value of the current of the battery 2 is equal to or smaller than the threshold, it is determined whether the SOC of the battery 2 changes. In an example, the threshold may be set to 0.

If the absolute value of the current that is the first subordinate physical quantity is larger than the threshold, the processing circuit 11 performs the above-described processes of steps S101 to S112 using the SOC time series data J1 and relationship data (first relationship data) D1, as in the first embodiment (step S122). Hence, for a period in which the absolute value of the current of the battery 2 is larger than the threshold, the processing circuit 11 extracts the local maximum value and the local minimum value of the SOC and the inter-extreme-value time from the SOC time series data J1 in the above-described way. Then, the processing circuit 11 calculates the decrease speed of the capacity of the battery 2 for each inter-extreme-value time based on the extracted local maximum value and local minimum value of the SOC (main physical quantity) and the relationship data D1. The decrease amount of the capacity of the battery 2 is calculated for each inter-extreme-value time, as in the above-described embodiment, and a cumulative value C1cal for the decrease amount of the capacity of the battery 2 is calculated, as in the above-described embodiment. Hence, the first cumulative value C1cal is calculated as the cumulative value of the decrease amount of the capacity in the period in which the absolute value of the current is larger than the threshold.

Also, in this embodiment, a storage medium 12 stores second relationship data D2 in addition to the first relationship data corresponding to the above-described relationship data D1. The second relationship data D2 represents the relationship of the decrease speed of the capacity of the battery 2, which is the state change speed, with the SOC as the main physical quantity and the temperature of the battery 2 as the second subordinate physical quantity. For example, the second relationship data D2 represents an expression, a function, a graph, a table, or the like which calculates the decrease speed of the capacity of the battery 2 using the value (holding value) of the SOC and the temperature, and represents, for example, a function for calculating the decrease speed of the capacity using the value of the SOC and the temperature as arguments. Note that when estimating the rising amount of the resistance of the battery 2 as the state change amount, the second relationship data D2 represents the relationship of the rising speed of the resistance of the battery 2, which is the state change speed, with the value of the SOC and the temperature.

The second relationship data D2 represents the influence of the SOC and the temperature of the battery 2 on the degradation speed and the degradation degree of the battery 2 in a state in which no current flows to the battery 2. Degradation of the battery 2 in a state in which no current flows to the battery 2 is also called "calendar degradation". The second relationship data D2 is generated based on, for example, the test result of a calendar test conducted in advance for the same battery as the battery 2. In the calendar test, holding values are set for the SOC and the temperature, the SOC and the temperature are held at the set holding values for a predetermined time, and the degradation degree of the battery, including the decrease of the capacity of the battery, is confirmed. In an example, the battery is held for a predetermined time in a state in which the SOC is 100%, and the temperature is 20° C. Then, calendar tests are performed under a plurality of conditions that are different from each other in at least one of the holding values of the SOC and the temperature, and the second relationship data D2 is generated based on the degradation degree of the battery or the like in each of the calendar tests under the plurality of conditions.

Figure 9:
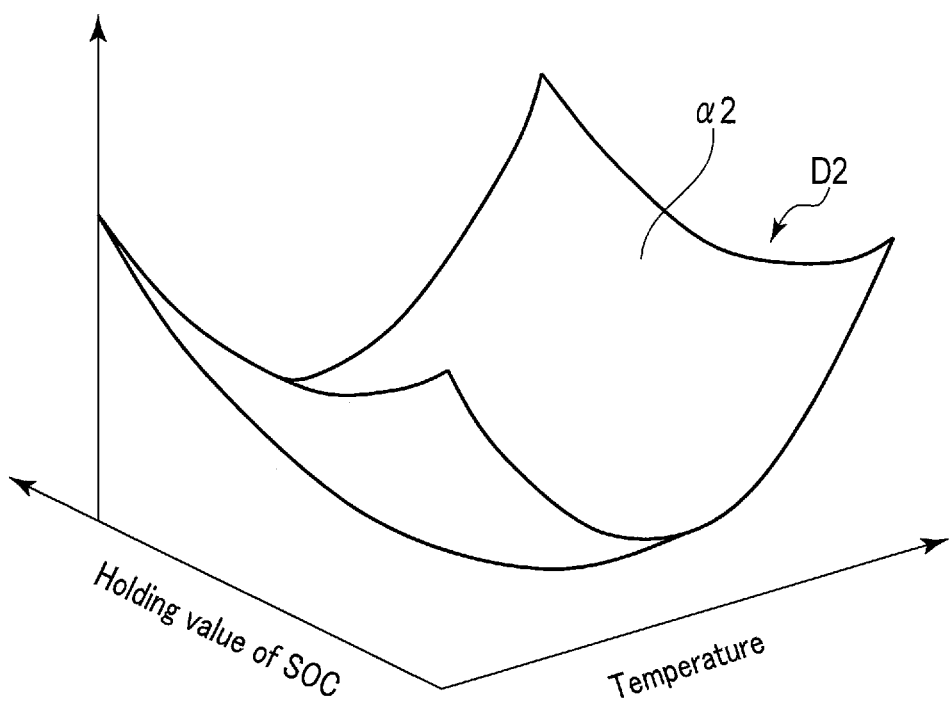
FIG. 9 is a schematic view showing an example of second associated data stored in the storage medium of the state estimation apparatus in the second embodiment.

FIG. 9 shows an example of the second relationship data D2. In the second relationship data D2 of the example shown in FIG. 9, a response surface α2 is shown on a 3-axis coordinate system in which the holding value of the SOC is represented by the first axis, the temperature is represented by the second axis, and the decrease speed of the capacity is represented by the third axis. The response surface α2 represents the relationship of the decrease speed of the capacity of the battery 2 with the holding value of the SOC and the temperature.

As shown in FIG. 8, if the absolute value of the current that is the first subordinate physical quantity is equal to or smaller than a threshold, the processing circuit 11 extracts, based on the SOC time series data J1, the holding value of the SOC of the battery 2 in each of periods in which the absolute value of the current is equal to or smaller than the threshold (step S123). Also, the processing circuit 11 calculates, based on the temperature time series data (third time series data) J3, the temperature of the battery 2 for each of the periods in which the absolute value of the current is equal to or smaller than the threshold (step S124). At this time, for example, the temperature is measured a plurality of times in each of the periods in which the absolute value of the current is equal to or smaller than the threshold, the average value or RMS value of the temperatures measured a plurality of times is calculated as the temperature in each of the periods in which the absolute value of the current is equal to or smaller than the threshold.

Then, based on the holding value of the SOC extracted by the process of step S123, the temperature calculated by the process of step S124, and the above-described second relationship data D2, the processing circuit 11 calculates the decrease speed of the capacity of the battery 2 for each period to hold the SOC (step S125). At this time, the extracted holding value of the SOC and the calculated temperature are substituted into a function including the holding value of the SOC and the temperature as arguments, thereby calculating the decrease speed of the capacity of the battery 2 as the state change speed of the battery 2. Note that the state change speed calculated based on the second relationship data D2 is also called a "second state change speed", and the decrease speed of the capacity calculated by the process of step S125 is also called a "second decrease speed".

Then, based on the decrease speed of the capacity calculated by the process of step S125, the processing circuit 11 calculates the decrease amount of the capacity of the battery 2 for each period to hold the SOC, that is, the SOC holding period (step S126). At this time, the decrease amount of the capacity, which is the state change amount of the battery 2, is calculated by, for example, multiplying the decrease speed of the capacity by the duration of the period to hold the SOC.

The processing circuit 11 calculates, based on the decrease amount of the capacity of the battery 2 in each period to hold the SOC, a second cumulative value C2cal as the cumulative value of the decrease amount of the capacity in the period in which the absolute value of the current is equal to or smaller than the threshold (step S127). At this time, for example, the decrease amount calculated by the process of step S126 is added to a second cumulative value C2real in real time, thereby updating the second cumulative value. The processing circuit 11 adds the first cumulative value C1cal calculated by the process of step S122 and the second cumulative value C2cal calculated by the process of step S127 (step S128). Thus, concerning the decrease amount of the capacity of the battery 2, a third cumulative value C3cal is calculated as a cumulative value including both the period in which the absolute value of the current is larger than the threshold and the period in which the absolute value of the current is equal to or smaller than the threshold. Hence, the cumulative value of the decrease amount of the capacity from the start time point of use of the battery 2 or the start time point of measurement of the current or the like is calculated as the third cumulative value C3cal.

In this embodiment as well, the same function and effect as in the first embodiment can be obtained. Also, in this embodiment, the state change speed (second state change speed) of the battery 2 such as the decrease speed of the capacity is calculated even for the period in which no current flows to the battery 2. Even for the period in which no current flows to the battery 2, the state change amount such as the decrease amount of the capacity of the battery 2 is calculated based on the calculated state change speed. Hence, the estimation accuracy for the state change of the battery 2 as the estimation target becomes higher.

Third Embodiment

The third embodiment will be described next as a modification of the first embodiment. In this embodiment, to estimate the decrease amount of the capacity, which is the state change amount of a battery 2, temperature time series data (third time series data) J3 representing the time change of the temperature of the battery 2 is used in addition to SOC time series data (first time series data) J1 described above. Also, in this embodiment, in processing of estimating the decrease amount of the capacity of the battery 2, a processing circuit 11 performs the processing using the SOC of the battery 2 as a main physical quantity and the temperature of the battery 2 as a subordinate physical quantity.

In this embodiment, a relationship data (first relationship data) D1 represents the relationship of the decrease speed of the capacity of the battery 2, which is the state change speed, with the local maximum value and the local minimum value of the SOC as the main physical quantity and the temperature of the battery 2 as the subordinate physical quantity. For example, the relationship data D1 represents an expression, a function, a graph, a table, or the like which calculates the decrease speed of the capacity of the battery 2 using the local maximum value and the local minimum value of the SOC and the temperature, and represents, for example, a function for calculating the decrease speed of the capacity using the local maximum value and the local minimum value of the SOC and the temperature as arguments. Hence, in the relationship data D1, the same response surface as the response surface α1 of the example shown in FIG. 7 is shown for each of a plurality of temperatures different from each other.

In this embodiment, for example, cycle tests are performed under a plurality of conditions of temperatures different from each other, thereby generating a response surface for each of the plurality of temperatures different from each other and generating the relationship data D1. Also, in an example, a response surface at a predetermined temperature is generated by a cycle test, and a response surface at a temperature other than the predetermined temperature is generated by performing an operation using the response surface at the predetermined temperature and an appropriate equation. Additionally, interpolation between data at temperatures different from each other is performed by an appropriate interpolation method such as linear interpolation, nearest neighbor interpolation, or spine interpolation.

FIG. 10 shows an example of processing performed by the processing circuit 11 executing a state estimation program 23 in this embodiment. In the example shown in FIG. 10, the processing circuit 11 performs the processes of steps S101 to S112 as in the example shown in FIG. 2 of the first embodiment. Also, in the example shown in FIG. 10, if it is determined, by the process of step S102, that the differential value of the SOC switches from positive to negative or if it is determined, by the process of step S103, that the differential value of the SOC switches from negative to positive, the processing circuit 11 extracts, from the temperature time series data, the time change of the temperature in a period corresponding to an inter-extreme-value time whose end time point is the switching timing (step S131).

For the inter-extreme-value time in which the time change of the temperature is extracted by the process of step S131, the processing circuit 11 calculates the value of the temperature of the battery 2 (step S132). At this time, in an example, the processing circuit 11 samples and holds the temperature of the battery 2 at each of the start time point and the end time point of the inter-extreme-value time. The average value of the two temperatures sampled and held is calculated as the value of the temperature of the battery 2 in the inter-extreme-value time. In another example, the processing circuit 11 acquires the temperature of the battery 2 for each of a plurality of time points between the start time point and the end time point of the inter-extreme-value time. The average value or RMS value of the temperatures at the plurality of time points is calculated as the value of the temperature of the battery 2 in the inter-extreme-value time.

Also, in the example shown in FIG. 10, in step S109, the processing circuit 11 calculates the decrease speed of the capacity of the battery 2 for each inter-extreme-value time based on the value of the temperature calculated by the process of step S132 in addition to the local maximum value and the local minimum value of the SOC extracted by the processes of steps S104 and S105 and the relationship data (first relationship data) D1. At this time, the extracted local maximum value and the local minimum value of the SOC and the calculated value of the temperature are substituted into a function including the local maximum value and the local minimum value of the SOC and the temperature as arguments, thereby calculating the decrease speed (first decrease speed) of the capacity of the battery 2 as the state change speed of the battery 2.

In this embodiment as well, the same function and effect as in the first embodiment can be obtained. Also, in this embodiment, the state change speed (first state change speed) of the battery 2 such as the decrease speed of the capacity is calculated for the inter-extreme-value time in consideration of not only the local maximum value and the local minimum value of the SOC of the battery 2 but also the influence of the temperature of the battery 2. For this reason, the state change amount such as the decrease amount of the capacity of the battery 2 is calculated in consideration of not only the local maximum value and the local minimum value of the SOC of the battery 2 but also the influence of the temperature of the battery 2. Hence, the estimation accuracy for the state change of the battery 2 as the estimation target becomes higher.

Modifications of Third Embodiment

In a modification of the third embodiment, current time series data (second time series data) J2 representing the time change of the current of the battery 2 is used in addition to the SOC time series data (first time series data) J1 and the temperature time series data (third time series data) J3 described above. Also, in this modification, in the processing of estimating the decrease amount of the capacity of the battery 2, the processing circuit 11 performs the processing using the SOC of the battery 2 as a main physical quantity and the temperature and the current (the absolute value of the current) of the battery 2 as subordinate physical quantities.

In this modification, the relationship data (first relationship data) D1 represents the relationship of the decrease speed of the capacity of the battery 2, which is the state change speed, with the local maximum value and the local minimum value of the SOC as the main physical quantity and the temperature and the absolute value of the current (the magnitude of the current) of the battery 2 as the subordinate physical quantities. For example, the relationship data D1 represents an expression, a function, a graph, a table, or the like which calculates the decrease speed of the capacity of the battery 2 using the local maximum value and the local minimum value of the SOC, the temperature, and the absolute value of the current including the C rate, and represents, for example, a function for calculating the decrease speed of the capacity using the local maximum value and the local minimum value of the SOC, the temperature, and the absolute value of the current as arguments. Hence, in the relationship data D1, the same response surface as the response surface α1 of the example shown in FIG. 7 is shown for each of a plurality of conditions that are different from each other in at least one of the temperature and the absolute value of the current.

In this modification, for example, cycle tests are performed under a plurality of conditions that are different from each other in at least one of the temperature and the absolute value of the current, thereby generating a response surface for each of the plurality of conditions that are different from each other in at least one of the temperature and the absolute value of the current and generating the relationship data D1. Also, in an example, a response surface under a predetermined condition in which a predetermined temperature and a predetermined current value are obtained is generated by a cycle test, and a response surface under a condition other than the predetermined condition is generated by performing an operation using the response surface under the predetermined condition and an appropriate equation. Additionally, interpolation between data for which the absolute values of currents are different from each other is performed by an appropriate interpolation method such as linear interpolation, nearest neighbor interpolation, or spine interpolation.

Figure 11:
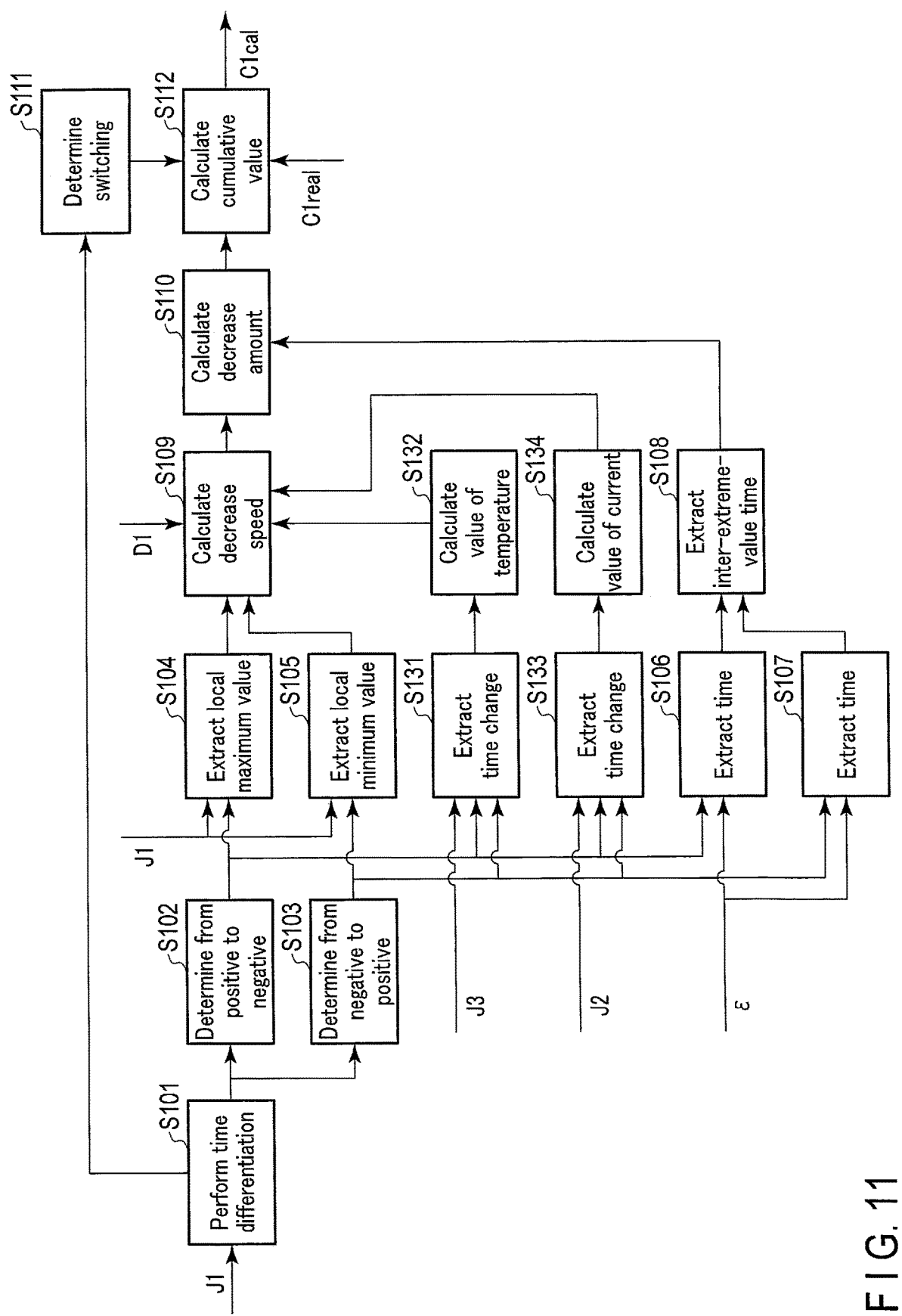
FIG. 11 is a schematic view showing an example of processing performed by a processing circuit executing a state estimation program in a state estimation apparatus according to a modification of the third embodiment.

FIG. 11 shows an example of processing performed by the processing circuit 11 executing the state estimation program 23 in this modification. In the example shown in FIG. 11, the processing circuit 11 performs the processes of steps S101 to S112, S131, and S132 as in the example shown in FIG. 10 of the third embodiment. Also, in the example shown in FIG. 10, if it is determined, by the process of step S102, that the differential value of the SOC switches from positive to negative or if it is determined, by the process of step S103, that the differential value of the SOC switches from negative to positive, the processing circuit 11 extracts, from the current time series data J2, the time change of the current in a period corresponding to an inter-extreme-value time whose end time point is the switching timing (step S133).

For the inter-extreme-value time in which the time change of the current is extracted by the process of step S133, the processing circuit 11 calculates the value of the current of the battery 2 (step S134). At this time, in a case where any one of the charging and discharging of the battery 2 is being performed in the inter-extreme-value time, the value of the current is calculated as the absolute value of the current (the magnitude of the current), and the calculated value of the current is a positive value. In an example, the processing circuit 11 acquires the absolute value of the current of the battery 2 for each of a plurality of time points between the start time point and the end time point of the inter-extreme-value time. The average value or RMS value of the absolute values of the currents at the plurality of time points is calculated as the value of the current of the battery 2 in the inter-extreme-value time.

Also, in the example shown in FIG. 10, in step S109, the processing circuit 11 calculates the decrease speed of the capacity of the battery 2 for each inter-extreme-value time based on the value of the current (first subordinate physical quantity) calculated by the process of step S134 in addition to the local maximum value and the local minimum value of the SOC extracted by the processes of steps S104 and S105, the relationship data (first relationship data) D1, and the value of the temperature (second subordinate physical quantity) calculated by the process of step S132. At this time, the extracted local maximum value and the local minimum value of the SOC and the calculated temperature value and current value are substituted into a function including the local maximum value and the local minimum value of the SOC, the temperature, and the absolute value of the current as arguments, thereby calculating the decrease speed (first decrease speed) of the capacity of the battery 2 as the state change speed of the battery 2.

In this modification as well, the same function and effect as in the third embodiment can be obtained. Also, in this modification, the state change speed (first state change speed) of the battery 2 such as the decrease speed of the capacity is calculated for the inter-extreme-value time in consideration of not only the local maximum value and the local minimum value of the SOC of the battery 2 and the temperature of the battery 2 but also the influence of the current flowing to the battery 2. For this reason, the state change amount such as the decrease amount of the capacity of the battery 2 is calculated in consideration of not only the local maximum value and the local minimum value of the SOC of the battery 2 and the temperature of the battery 2 but also the influence of the current flowing to the battery 2. Hence, the estimation accuracy for the state change of the battery 2 as the estimation target becomes higher.

Also, in a modification, the relationship data (first relationship data) D1 represents the relationship of the decrease speed of the capacity of the battery 2, which is the state change speed, with the local maximum value and the local minimum value of the SOC as the main physical quantity and the absolute value of the current (the magnitude of the current) of the battery 2 as the subordinate physical quantity (first subordinate physical quantity). In this case, the processes of steps S101 to S112, S133, and S134 shown in the example of FIG. 11 are performed, and the processes of steps S131 and S132 are not performed. In step S109, the processing circuit 11 calculates the decrease speed of the capacity of the battery 2 for each inter-extreme-value time based on the local maximum value and the local minimum value of the SOC extracted by the processes of steps S104 and S105, the relationship data (first relationship data) D1, and the value of the current calculated by the process of step S134. In this modification as well, the same function and effect as in the above-described embodiment can be obtained.

Also, in a modification, as in the third embodiment and the modifications thereof, the relationship data (first relationship data) D1 represents the relationship of the decrease speed of the capacity of the battery 2, which is the state change speed, with the local maximum value and the local minimum value of the SOC as the main physical quantity, and also represents the relationship of the decrease speed of the capacity of the battery 2 with at least one of the temperature and the absolute value of the current (the magnitude of the current) of the battery 2 as the subordinate physical quantities. That is, the relationship data D1 represents the relationship of the decrease speed of the capacity of the battery 2 with the local maximum value and the local minimum value of the SOC and at least one of the temperature (second subordinate physical quantity) and the absolute value of the current (first subordinate physical quantity) of the battery 2. As in the second embodiment, the processing circuit 11 determines, based on the current time series data (second time series data) J2, whether the absolute value of the current of the battery 2 is equal to or smaller than a threshold. For a period in which the absolute value of the current (first subordinate physical quantity) of the battery 2 is larger than the threshold, the processing circuit 11 calculates, for each inter-extreme-value time, the decrease speed of the capacity of the battery 2 as the state change speed (first state change speed), as in the third embodiment. At this time, the decrease speed of the capacity of the battery 2 is calculated based on the local maximum value and the local minimum value of the SOC of the battery 2 as the main physical quantity extracted from the SOC time series data (first time series data), at least one of the absolute value of the current (first subordinate physical quantity) and the temperature (second subordinate physical quantity) concerning the battery 2 in the inter-extreme-value time, and the relationship data D1.

As described above, in this modification, at least one of the absolute value of the current (first subordinate physical quantity) and the temperature (second subordinate physical quantity) of the battery 2 is included in the subordinate physical quantity whose relationship with the degradation speed of the capacity is represented by the relationship data (first relationship data) D1. In this modification as well, the decrease amount of the capacity of the battery 2 is calculated for each inter-extreme-value time, as in the third embodiment. Then, a first cumulative value C1cal is calculated as the cumulative value of the decrease amount of the capacity in the period in which the absolute value of the current is larger than the threshold.

Also, in this modification, as in the second embodiment, second relationship data D2 that represents the relationship of the decrease speed of the capacity of the battery 2, which is the state change speed, with the SOC (main physical quantity) and the temperature (second subordinate physical quantity) of the battery 2 is stored in a storage medium 12. For a period in which the absolute value of the current (first subordinate physical quantity) of the battery 2 is equal to or smaller than the threshold, as in the second embodiment, the processing circuit 11 calculates the decrease speed of the capacity of the battery 2 as the state change speed (second state change speed) for each period to hold the SOC. At this time, the decrease speed of the capacity of the battery 2 is calculated based on the holding value of the SOC extracted from the SOC time series data J1, the value of the temperature of the battery 2 based on the temperature time series data J3, and the second relationship data D2.

In this modification as well, as in the second embodiment, the processing circuit 11 calculates the decrease amount of the capacity of the battery 2 for each period to hold the SOC. Then, a second cumulative value C2cal is calculated as the cumulative value of the decrease amount of the capacity in the period in which the absolute value of the current is equal to or smaller than the threshold. As in the second embodiment, the processing circuit 11 adds the first cumulative value C1cal and the second cumulative value C2cal. Thus, concerning the decrease amount of the capacity of the battery 2, a third cumulative value C3cal is calculated as a cumulative value including both the period in which the absolute value of the current is larger than the threshold and the period in which the absolute value of the current is equal to or smaller than the threshold. In this modification as well, the same function and effect as in the above-described embodiments can be obtained.

Fourth Embodiment

The fourth embodiment will be described next as a modification of the third embodiment. In this embodiment, a reference value is set for the absolute value of the current of a battery 2, which is a subordinate physical quantity. Relationship data (first relationship data) D1 represents a first relationship K1 that is the relationship of the decrease speed of the capacity of the battery 2, which is the state change speed, with the local maximum value and the local minimum value of the SOC as the main physical quantity and the temperature of the battery 2 in a case where the absolute value of the current is smaller than the reference value. Also, the relationship data D1 represents a second relationship K2 that is the relationship of the decrease speed of the capacity of the battery 2 with the local maximum value and the local minimum value of the SOC and the temperature of the battery 2 in a case where the absolute value of the current is equal to or larger than the reference value.

Each of the first relationship K1 and the second relationship K2 is an expression, a function, a graph, a table, or the like which calculates the decrease speed of the capacity of the battery 2 using the local maximum value and the local minimum value of the SOC and the temperature, and is, for example, a function for calculating the decrease speed of the capacity using the local maximum value and the local minimum value of the SOC and the temperature as arguments. In the functions corresponding to the first relationship K1 and the second relationship K2, the absolute value of the current is not an argument. Hence, in the relationship data D1, the same response surface as the response surface α1 of the example shown in FIG. 7 is shown for each of the case where the absolute value of the current is smaller than the reference value and the case where the absolute value of the current is equal to or larger than the reference value.

Figure 12A:
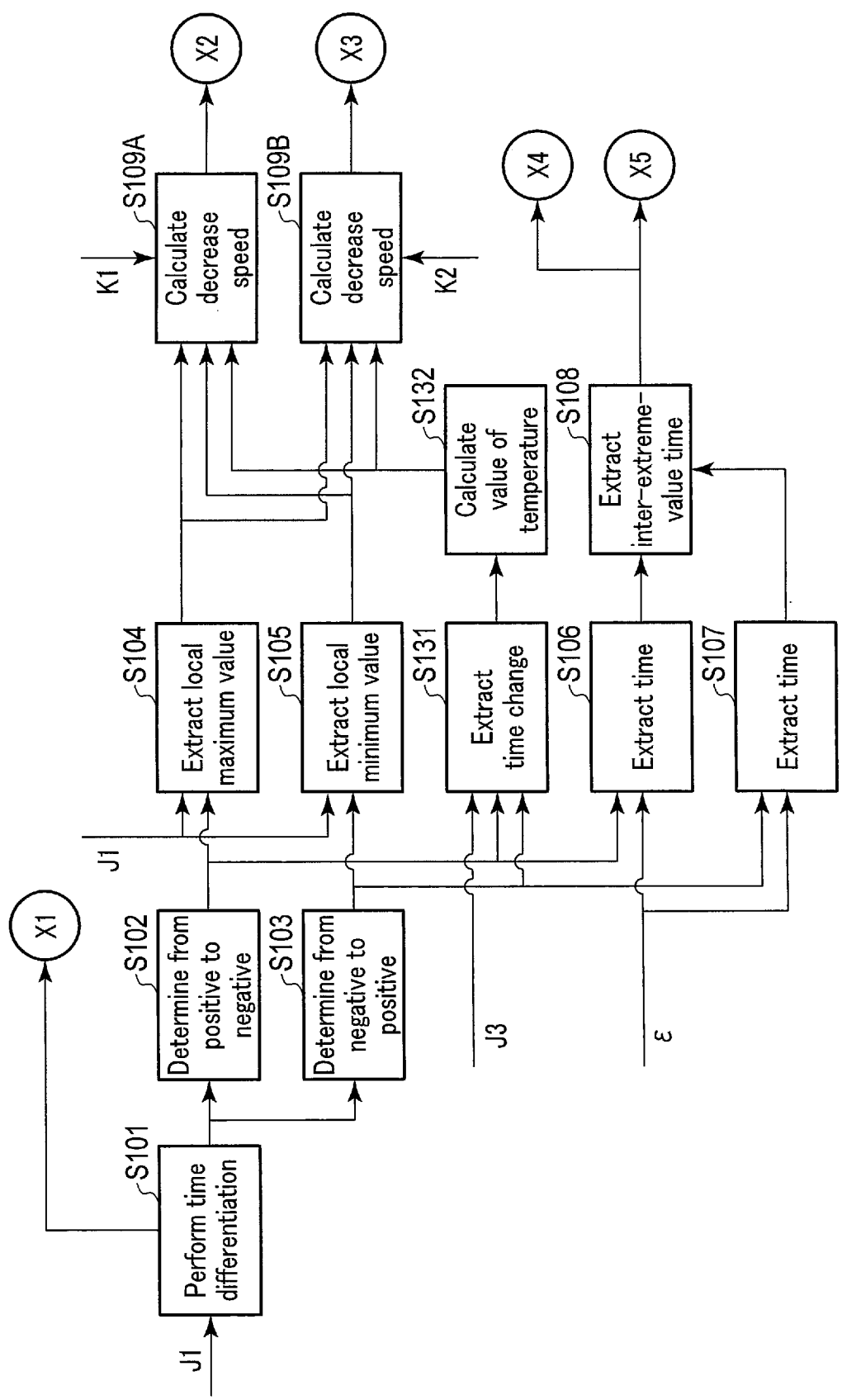
FIG. 12A is a schematic view showing a part of an example of processing performed by a processing circuit executing a state estimation program in a state estimation apparatus according to the fourth embodiment.
Figure 12B:
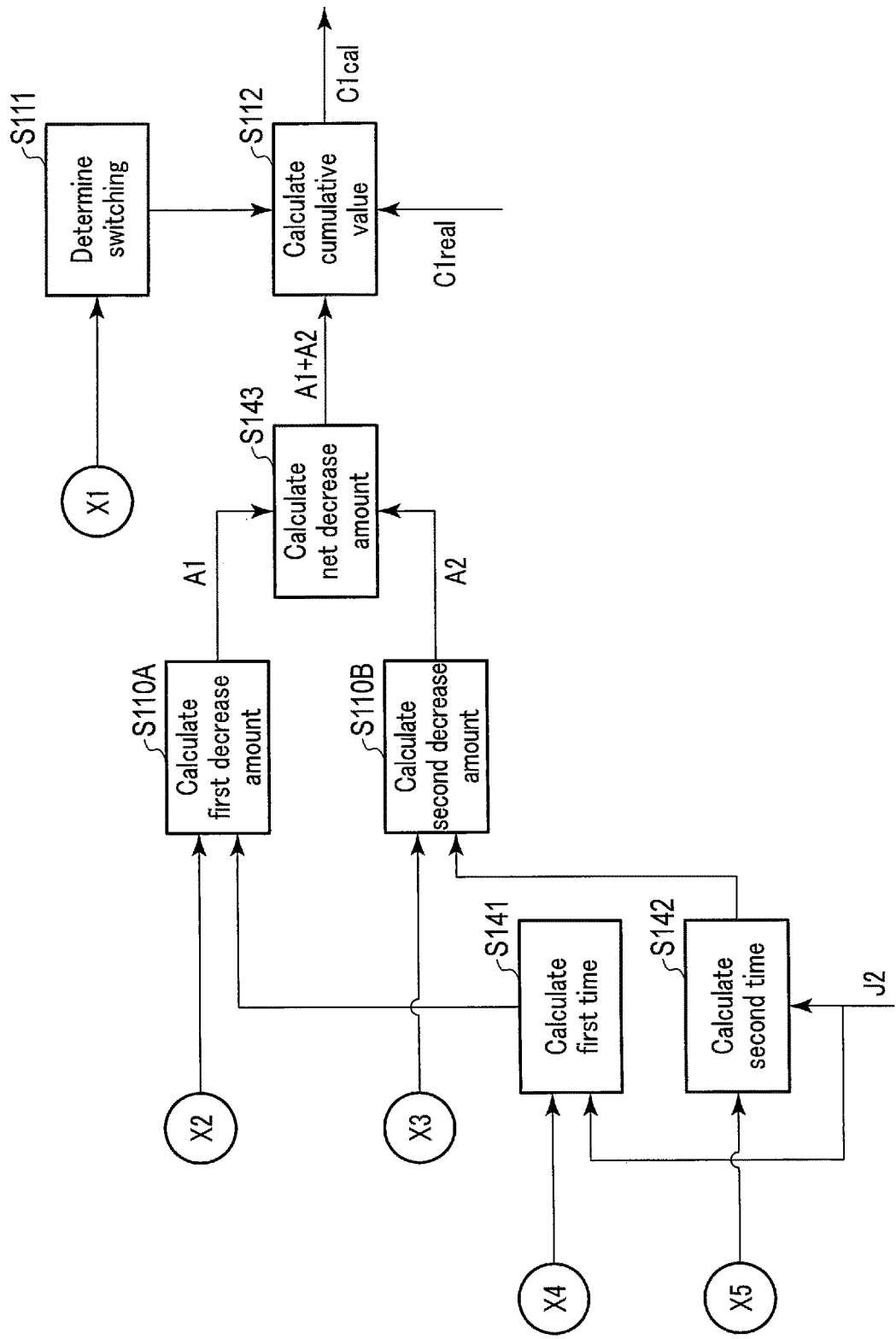
FIG. 12B is a schematic view showing a part other than the part shown in FIG. 12A in the example of the processing performed by the processing circuit executing the state estimation program in the state estimation apparatus according to the fourth embodiment.

FIGS. 12A and 12B show an example of processing performed by a processing circuit 11 executing a state estimation program 23 in this embodiment. In the example shown in FIGS. 12A and 12B, the processing circuit 11 performs the processes of steps S101 to S108, S131, and S132 as in the example shown in FIG. 10 of the third embodiment. Also, in the example shown in FIGS. 12A and 12B, when an inter-extreme-value time is extracted by the process of step S108, based on current time series data (second time series data) J2, the processing circuit 11 calculates, for each extracted inter-extreme-value time, a first time in which the absolute value of the current as the subordinate physical quantity is smaller than the reference value (step S141). Also, based on the current time series data J2, the processing circuit 11 calculates, for each extracted inter-extreme-value time, a second time in which the absolute value of the current is equal to or larger than the reference value (step S142).

In the example shown in FIGS. 12A and 12B, the processing circuit 11 performs the processes of steps S109A and S109B in place of the process of step S109, and performs the processes of steps S110A, S110B, and S143 in place of the process of step S110. That is, based on the local maximum value and the local minimum value of the SOC extracted by the processes of steps S104 and S105, the value of the temperature calculated by the process of step S132, and the first relationship K1 represented by the relationship data (first relationship data) D1, the processing circuit 11 calculates, for each inter-extreme-value time, the decrease speed of the capacity of the battery 2 in a case where the absolute value of the current is smaller than the reference value (step S109A). At this time, for example, the extracted local maximum value and local minimum value of the SOC and the calculated value of the temperature are substituted into the function of the first relationship K1 including the local maximum value and the local minimum value of the SOC and the temperature as arguments, thereby calculating the decrease speed (first decrease speed) of the capacity of the battery 2 as the state change speed of the battery 2.

Also, based on the local maximum value and the local minimum value of the SOC extracted by the processes of steps S104 and S105, the value of the temperature calculated by the process of step S132, and the second relationship K2 represented by the relationship data (first relationship data) D1, the processing circuit 11 calculates, for each inter-extreme-value time, the decrease speed of the capacity of the battery 2 in a case where the absolute value of the current is equal to or larger than the reference value (step S109B). At this time, for example, the extracted local maximum value and local minimum value of the SOC and the calculated value of the temperature are substituted into the function of the second relationship K2 including the local maximum value and the local minimum value of the SOC and the temperature as arguments, thereby calculating the decrease speed (first decrease speed) of the capacity of the battery 2 as the state change speed of the battery 2.

Then, based on the first time calculated by the process of step S141 and the decrease speed of the capacity based on the first relationship K1 which is calculated by the process of step S109A, the processing circuit 11 calculates, for each inter-extreme-value time, a first decrease amount A1 of the capacity as the decrease amount of the capacity of the battery 2 in the first time (step S110A). At this time, the first decrease amount (first state change amount) A1 of the capacity, which is the state change amount of the battery 2, is calculated by, for example, multiplying the decrease speed of the capacity based on the first relationship K1 by the first time.

Also, based on the second time calculated by the process of step S142 and the decrease speed of the capacity based on the second relationship K2 which is calculated by the process of step S109B, the processing circuit 11 calculates, for each inter-extreme-value time, a second decrease amount A2 of the capacity as the decrease amount of the capacity of the battery 2 in the second time (step S110B). At this time, the second decrease amount (second state change amount) A2 of the capacity, which is the state change amount of the battery 2, is calculated by, for example, multiplying the decrease speed of the capacity based on the second relationship K2 by the second time.

The processing circuit 11 calculates the sum (A1+A2) of the first decrease amount A1 of the capacity calculated by the process of step S110A and the second decrease amount A2 of the capacity calculated by the process of step S110B as the net decrease amount of the capacity in the inter-extreme-value time (step S143). Thus, for each inter-extreme-value time, the net decrease amount of the capacity in the entire inter-extreme-value time including the first time and the second time is calculated.

In the example shown in FIGS. 12A and 12B as well, the processing circuit 11 performs the processes of steps S111 and S112, as in the example of FIG. 10 of the third embodiment. In this embodiment, in step S112, the net decrease amount (A1+A2) of the capacity in the inter-extreme-value time, which is calculated by the process of step S143, is added to a cumulative value C1real of the decrease amount of the capacity in real time, thereby calculating a cumulative value C1cal of the decrease amount of the capacity.

In this modification as well, the same function and effect as in the third embodiment can be obtained. Also, in this modification, the state change speed (first state change speed) of the battery 2 such as the decrease speed of the capacity is calculated for the inter-extreme-value time in consideration of not only the local maximum value and the local minimum value of the SOC of the battery 2 and the temperature of the battery 2 but also the influence of the current flowing to the battery 2. For this reason, the state change amount such as the decrease amount of the capacity of the battery 2 is calculated in consideration of not only the local maximum value and the local minimum value of the SOC of the battery 2 and the temperature of the battery 2 but also the influence of the current flowing to the battery 2. Hence, the estimation accuracy for the state change of the battery 2 as the estimation target becomes higher.

Modifications of Fourth Embodiment

Note that in the fourth embodiment, only one reference value is set for the absolute value of the current. In a modification, two or more reference values are set for the absolute value of the current. In the relationship data D1, the absolute value of the current is classified into three or more ranges based on the two or more reference values, and the relationship of the decrease speed of the capacity of the battery 2, which is the state change speed, with the local maximum value and the local minimum value of the SOC and the temperature of the battery 2 is shown for each of the three or more ranges classified for the absolute value of the current.

In this case, the processing circuit 11 classifies the inter-extreme-value time into three or more times based on the two or more reference values for the absolute value of the current. Then, as in the fourth embodiment, for each of the three or more classified times, the decrease speed of the capacity and the decrease amount of the capacity are calculated based on a corresponding one of the relationships represented by the relationship data D1. Then, the sum of the decrease amounts of the capacity in the three or more times is calculated as the net decrease amount of the capacity in the inter-extreme-value time.

Also, in a modification, each of the first relationship K1 and the second relationship K2 represented by the relationship data D1 represents the relationship of the decrease speed of the capacity of the battery 2, which is the state change speed, with the local maximum value and the local minimum value of the SOC but not the relationship of the decrease speed of the capacity of the battery 2 with the temperature. In this case, in the example shown in FIGS. 12A and 12B, the processes of steps S131 and S132 are not performed. In step S109A, based on the local maximum value and the local minimum value of the SOC extracted by the processes of steps S104 and S105 and the first relationship K1 represented by the relationship data D1, the decrease speed of the capacity of the battery 2 in a case where the absolute value of the current is smaller than the reference value is calculated for each inter-extreme-value time. Similarly, in step S109B, based on the local maximum value and the local minimum value of the SOC extracted by the processes of steps S104 and S105 and the second relationship K2 represented by the relationship data D1, the decrease speed of the capacity of the battery 2 in a case where the absolute value of the current is equal to or larger than the reference value is calculated for each inter-extreme-value time.

Also, in a modification, as in the fourth embodiment and the modifications thereof, the relationship data (first relationship data) D1 represents the first relationship K1 that is the relationship of the decrease speed of the capacity of the battery 2, which is the state change speed, with the local maximum value and the local minimum value of the SOC as the main physical quantity in a case where the absolute value of the current (first subordinate physical quantity) is smaller than the reference value and the second relationship K2 that is the relationship of the decrease speed of the capacity of the battery 2 with the local maximum value and the local minimum value of the SOC in a case where the absolute value of the current is equal to or larger than the reference value. As in the second embodiment, the processing circuit 11 determines, based on the current time series data (second time series data) J2, whether the absolute value of the current of the battery 2 is equal to or smaller than a threshold. In this modification, the threshold set for the absolute value of the current is smaller than any of the one or more reference values.

In this modification, for a period in which the absolute value of the current (first subordinate physical quantity) of the battery 2 is larger than the threshold, the processing circuit 11 calculates, for each inter-extreme-value time, the decrease speed of the capacity of the battery 2 as the state change speed (first state change speed), as in the fourth embodiment. At this time, the decrease speed of the capacity of the battery 2 in a case where the absolute value of the current is smaller than the reference value is calculated based on the local maximum value and the local minimum value of the SOC extracted from the SOC time series data (first time series data) J1 and the first relationship K1 represented by the relationship data (first relationship data) D1. In addition, the decrease speed of the capacity of the battery 2 in a case where the absolute value of the current is equal to or larger than the reference value is calculated based on the local maximum value and the local minimum value of the SOC extracted from the SOC time series data J1 and the second relationship K2 represented by the relationship data D1. In this modification as well, as in the fourth embodiment, for each inter-extreme-value time, the net decrease amount of the capacity in the entire inter-extreme-value time including the first time and the second time is calculated. Then, the first cumulative value C1cal is calculated as the cumulative value of the decrease amount of the capacity in a period in which the absolute value of the current is larger than the threshold.

Also, in this modification, as in the second embodiment, second relationship data D2 that represents the relationship of the decrease speed of the capacity of the battery 2, which is the state change speed, with the SOC (main physical quantity) and the temperature (second subordinate physical quantity) of the battery 2 is stored in a storage medium 12. For a period in which the absolute value of the current of the battery 2 is equal to or smaller than the threshold, as in the second embodiment, the processing circuit 11 calculates the decrease speed of the capacity of the battery 2 as the state change speed (second state change speed) for each period to hold the SOC. At this time, the decrease speed of the capacity of the battery 2 is calculated based on the holding value of the SOC extracted from the SOC time series data J1, the value of the temperature of the battery 2 based on the temperature time series data (third time series data) J3, and the second relationship data D2.

In this modification as well, as in the second embodiment, the processing circuit 11 calculates the decrease amount of the capacity of the battery 2 for each period to hold the SOC. Then, a second cumulative value C2cal is calculated as the cumulative value of the decrease amount of the capacity in the period in which the absolute value of the current is equal to or smaller than the threshold. As in the second embodiment, the processing circuit 11 adds the first cumulative value C1cal and the second cumulative value C2cal. Thus, concerning the decrease amount of the capacity of the battery 2, a third cumulative value C3cal is calculated as a cumulative value including both the period in which the absolute value of the current is larger than the threshold and the period in which the absolute value of the current is equal to or smaller than the threshold. In this modification as well, the same function and effect as in the above-described embodiments can be obtained.

Other Embodiments

Note that in the above-described embodiments, a battery has been exemplified as the state change estimation target. However, the state change estimation target is not limited to this. In a modification, a joint portion by soldering is set to the estimation target, and a state change is estimated. In this case, the temperature of the joint portion is used as the main physical quantity in place of the above-described SOC, and the state change is estimated. The relationship data D1 represents the relationship of the creep rate (strain rate) of the joint portion with the local maximum value and the local minimum value of the temperature of the joint portion. In this modification, the processing circuit or the like extracts the local maximum value and the local minimum value of the temperature and the inter-extreme-value time from temperature time series data representing the time change of the temperature of the joint portion. Then, the processing circuit or the like calculates the creep rate of the joint portion based on the extracted local maximum value and local minimum value of the temperature and the relationship data D1. The processing circuit or the like calculates, for each inter-extreme-value time, the creep amount (strain amount) of the joint portion based on the calculated creep rate and the extracted inter-extreme-value time.

In at least one embodiment or example described above, the local maximum value and the local minimum value of the main physical quantity and the inter-extreme-value time from an extreme value to the next extreme value are extracted from time series data representing the time change of the main physical quantity, and the state change speed of the estimation target is calculated based on the relationship data representing the relationship of the state change speed of the estimation target with the local maximum value and the local minimum value of the main physical quantity and the extracted local maximum value and local minimum value of the main physical quantity. Then, the state change amount of the estimation target is calculated for each inter-extreme-value time based on the extracted inter-extreme-value time and the calculated state change speed. It is therefore possible to provide a state estimation method, a state estimation apparatus, a state estimation system, and a state estimation program, each of which implements simple configurations of the apparatus and system for estimating a state change of an estimation target and makes the estimation accuracy for the state change of the estimation target higher.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A state estimation method comprising:
receiving a measurement result from a current detection circuit, the measuring result being of a current flowing to a battery that is periodically detected and measured by the current detection circuit;
generating current time series data representing a time change of the current flowing to the battery, based on the measurement result of the current detection circuit;
generating first time series data representing a time change of a main physical quantity concerning an estimation target, based on the current time series data;
extracting, from the first time series data representing the time change of the main physical quantity concerning an estimation target, a local maximum value and a local minimum value, which are extreme values of the main physical quantity, and an inter-extreme-value time from the extreme value to the next extreme value;
calculating, based on first relationship data representing a relationship of a state change speed of the estimation target with the local maximum value and the local minimum value of the main physical quantity, and the extracted local maximum value and local minimum value of the main physical quantity, a first state change speed as the state change speed of the estimation target for each inter-extreme-value time; and
calculating, based on the extracted inter-extreme-value time and the calculated first state change speed, a state change amount of the estimation target for each inter-extreme-value time, wherein
the main physical quantity is an SOC of the battery as the estimation target, and the state change speed of the estimation target including the first state change speed is one of a decrease speed of a capacity of the battery and a rising speed of a resistance.

2. The method according to claim 1, wherein in the extracting the extreme values of the main physical quantity from the first time series data,
 a time change of a differential value of the main physical quantity is calculated by time-differentiating the main physical quantity in the first time series data,
 a value of the main physical quantity at a timing when the differential value of the main physical quantity switches from positive to negative is extracted as the local maximum value, and
 a value of the main physical quantity at a timing when the differential value of the main physical quantity switches from negative to positive is extracted as the local minimum value.

3. The method according to claim 1, wherein in the extracting the inter-extreme-value time from the first time series data,
 a time change of a differential value of the main physical quantity is calculated by time-differentiating the main physical quantity in the first time series data, and
 each of a time from a timing when the differential value of the main physical quantity switches from positive to negative to a timing when the differential value of the main physical quantity switches from negative to positive next and a time from a timing when the differential value of the main physical quantity switches from negative to positive to a timing when the differential value of the main physical quantity switches from positive to negative next is extracted as the inter-extreme-value time.

4. The method according to claim 1, further comprising calculating a cumulative value of the state change amount of the estimation target from the state change amount of the estimation target for each inter-extreme-value time.

5. The method according to claim 4, wherein in the calculating the cumulative value of the state change amount of the estimation target,
 a time change of a differential value of the main physical quantity is calculated by time-differentiating the main physical quantity in the first time series data, and
 at each of the timing when the differential value of the main physical quantity switches from positive to negative and the timing when the differential value of the main physical quantity switches from negative to positive, the state change amount of the estimation target in the inter-extreme-value time is added to the cumulative value in real time.

6. The method according to claim 4, wherein in the calculating the cumulative value of the state change amount of the estimation target,
 for each predetermined period including a plurality of inter-extreme-value times, the state change amount of the estimation target in the predetermined period is calculated from the state change amount of the estimation target in each of the plurality of inter-extreme-value times, and
 every time the predetermined period ends, the state change amount in the predetermined period is added to the cumulative value in real time.

7. The method according to claim 1, further comprising:
 determining, based on second time series data representing a time change of a first subordinate physical quantity concerning the estimation target, whether the first subordinate physical quantity is not more than a threshold;
 calculating, for a period in which the first subordinate physical quantity is larger than the threshold, the first state change speed of the estimation target for each inter-extreme-value time based on the local maximum value and the local minimum value of the main physical quantity extracted from the first time series data and the first relationship data; and
 calculating, for a period in which the first subordinate physical quantity is not more than the threshold, a second state change speed as the state change speed of the estimation target based on second relationship data representing a relationship of the state change speed of the estimation target with the main physical quantity and a second subordinate physical quantity concerning the estimation target, a holding value of the main physical quantity in the first time series data, and a value of the second subordinate physical quantity based on third time series data representing a time change of the second subordinate physical quantity.

8. The method according to claim 7, wherein
 the first subordinate physical quantity is an absolute value of a current flowing to the battery,
 the second subordinate physical quantity is a temperature of the battery, and
 the second state change speed is one of the decrease speed of the capacity of the battery and the rising speed of the resistance.

9. The method according to claim 1, further comprising performing at least one of calculating a value of a first subordinate physical quantity in the inter-extreme-value time based on second time series data representing a time change of the first subordinate physical quantity concerning the estimation target and calculating a value of a second subordinate physical quantity in the inter-extreme-value time based on third time series data representing a time change of the second subordinate physical quantity concerning the estimation target,
 wherein the first relationship data represents a relationship of the state change speed of the estimation target with at least one of the first subordinate physical quantity and the second subordinate physical quantity in addition to the relationship of the state change speed of the estimation target with the local maximum value and the local minimum value of the main physical quantity, and
 in the calculating the first state change speed, the first state change speed is calculated based on the first relationship data, the local maximum value and the local minimum value of the main physical quantity extracted from the first time series data, and the value of at least one of the first subordinate physical quantity and the second subordinate physical quantity in the inter-extreme-value time.

10. The method according to claim 9, further comprising:
 determining, based on the second time series data, whether the first subordinate physical quantity is not more than a threshold;
 calculating, for a period in which the first subordinate physical quantity is larger than the threshold, the first state change speed of the estimation target for each inter-extreme-value time based on the local maximum value and the local minimum value of the main physical quantity extracted from the first time series data, the value of at least one of the first subordinate physical quantity and the second subordinate physical quantity in the inter-extreme-value time, and the first relationship data; and calculating, for a period in which the first subordinate physical quantity is not more than the threshold, a second state change speed as the state change speed of the estimation target based on a value of the second subordinate physical quantity based on the third time series data, second relationship data representing a relationship of the state change speed of the estimation target with the main physical quantity and the second subordinate physical quantity concerning the estimation target, and a holding value of the main physical quantity in the first time series data.

11. The method according to claim 9, wherein
the first subordinate physical quantity is an absolute value of a current flowing to the battery, and
the second subordinate physical quantity is a temperature of the battery.

12. The method according to claim 1, further comprising calculating, based on second time series data representing a time change of a first subordinate physical quantity concerning the estimation target, a first time in which the first subordinate physical quantity is less than a reference value and a second time in which the first subordinate physical quantity is not less than the reference value for each inter-extreme-value time, wherein the first relationship data represents a first relationship that is a relationship of the state change speed of the estimation target with the local maximum value and the local minimum value of the main physical quantity in a case where the first subordinate physical quantity is less than the reference value and a second relationship that is a relationship of the state change speed of the estimation target with the local maximum value and the local minimum value of the main physical quantity in a case where the first subordinate physical quantity is not less than the reference value, in the calculating the first state change speed, in the case where the first subordinate physical quantity is less than the reference value, the first state change speed is calculated based on the first relationship represented by the first relationship data and the local maximum value and the local minimum value of the main physical quantity extracted from the first time series data, and in the case where the first subordinate physical quantity is not less than the reference value, the first state change speed is calculated based on the second relationship represented by the first relationship data and the local maximum value and the local minimum value of the main physical quantity extracted from the first time series data, and in the calculating the state change amount of the estimation target in the inter-extreme-value time, a first state change amount is calculated as the state change amount of the estimation target in the first time based on the first state change speed based on the first relationship and the calculated first time, a second state change amount is calculated as the state change amount of the estimation target in the second time based on the first state change speed based on the second relationship and the calculated second time, and a sum of the first state change amount and the second state change amount is calculated as the state change amount of the estimation target in the inter-extreme-value time.

13. The method according to claim 12, further comprising:

determining, based on the second time series data, whether the first subordinate physical quantity is not more than a threshold smaller than the reference value;

for a period in which the first subordinate physical quantity is larger than the threshold and for each inter-extreme-value time, calculating the first state change speed of the estimation target in the case where the first subordinate physical quantity is less than the reference value based on the local maximum value and the local minimum value of the main physical quantity extracted from the first time series data and the first relationship represented by the first relationship data and calculating the first state change speed of the estimation target in the case where the first subordinate physical quantity is not less than the reference value based on the local maximum value and the local minimum value of the main physical quantity extracted from the first time series data and the second relationship represented by the first relationship data; and calculating, for a period in which the first subordinate physical quantity is not more than the threshold, the second state change speed as the state change speed of the estimation target based on second relationship data representing a relationship of the state change speed of the estimation target with the main physical quantity and second subordinate physical quantity concerning the estimation target, a holding value of the main physical quantity in the first time series data, and a value of the second subordinate physical quantity based on third time series data representing a time change of the second subordinate physical quantity.

14. The method according to claim 12, wherein
the first subordinate physical quantity is an absolute value of a current flowing to the battery.

15. A state estimation apparatus comprising:
a processor configured to:
receive a measurement result from a current detection circuit, the measuring result being of a current flowing to a battery that is periodically detected and measured by the current detection circuit;

generate current time series data representing a time change of the current flowing to the battery, based on the measurement result of the current detection circuit;

generate first time series data representing a time change of a main physical quantity concerning an estimation target, based on the current time series data;

extract, from time series data representing the time change of the main physical quantity concerning an estimation target, a local maximum value and a local minimum value, which are extreme values of the main physical quantity, and an inter-extreme-value time from the extreme value to the next extreme value;

calculate, based on relationship data representing a relationship of a state change speed of the estimation target with the local maximum value and the local minimum value of the main physical quantity, and the extracted local maximum value and local minimum value of the main physical quantity, the state change speed of the estimation target for each inter-extreme-value time; and calculate, based on the extracted inter-extreme-value time and the calculated state change speed for each inter-extreme-value time, a state change amount of the estimation target for each inter-extreme-value time, wherein the estimation target is the battery, the main physical quantity is an SOC of the battery, and the state change speed of the estimation target is one of a decrease speed of a capacity of the battery and a rising speed of a resistance.

16. A state estimation system comprising:

the state estimation apparatus defined in claim 15; and the estimation target whose state change is estimated by the state estimation apparatus.

17. A non-transitory storage medium storing a state estimation program causing a computer to:

receive a measurement result from a current detection circuit, the measuring result being of a current flowing to a battery that is periodically detected and measured by the current detection circuit;

generate current time series data representing a time change of the current flowing to the battery, based on the measurement result of the current detection circuit;

generate first time series data representing a time change of a main physical quantity concerning an estimation target, based on the current time series data;

extract, from time series data representing the time change of the main physical quantity concerning an estimation target, a local maximum value and a local minimum value, which are extreme values of the main physical quantity, and an inter-extreme-value time from the extreme value to the next extreme value;

calculate, based on relationship data representing a relationship of a state change speed of the estimation target with the local maximum value and the local minimum value of the main physical quantity, and the extracted local maximum value and local minimum value of the main physical quantity, the state change speed of the estimation target for each inter-extreme-value time; and calculate, based on the extracted inter-extreme-value time and the calculated state change speed for each inter-extreme-value time, a state change amount of the estimation target for each inter-extreme-value time, wherein the estimation target is the battery, the main physical quantity is an SOC of the battery, and the state change speed of the estimation target is one of a decrease speed of a capacity of the battery and a rising speed of a resistance.

\* \* \* \* \*